(12) United States Patent
Sylvan et al.

(10) Patent No.: US 10,606,540 B2
(45) Date of Patent: *Mar. 31, 2020

(54) DEVICE HAVING A SCREEN REGION ON A HINGE COUPLED BETWEEN OTHER SCREEN REGIONS

(71) Applicant: Microsoft Technology Licensing, LLC, Redmond, WA (US)

(72) Inventors: Roger Sebastian Sylvan, Seattle, WA (US); Aaron M. Burns, Newcastle, WA (US); Kenneth L. Kiemele, Redmond, WA (US); Charlene Mary Jeune, Redmond, WA (US); Christian Sadak, Seattle, WA (US); John B. Hesketh, Kirkland, WA (US); Jeffrey R. Sipko, Kirkland, WA (US); Christian Klein, Duvall, WA (US); Gregg R. Wygonik, Duvall, WA (US); Sophors Khut, Seattle, WA (US); Michael R. Thomas, Redmond, WA (US); Ricardo Arturo Espinoza Reyes, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/505,641

(22) Filed: Jul. 8, 2019

(65) Prior Publication Data
US 2019/0332343 A1 Oct. 31, 2019

Related U.S. Application Data

(63) Continuation of application No. 15/347,764, filed on Nov. 9, 2016, now Pat. No. 10,346,117.

(51) Int. Cl.
*G06F 1/16* (2006.01)
*G06F 3/14* (2006.01)
*G06F 3/0346* (2013.01)
*G06F 3/0488* (2013.01)
(Continued)

(52) U.S. Cl.
CPC .......... *G06F 3/1423* (2013.01); *G06F 1/1618* (2013.01); *G06F 1/1677* (2013.01); *G06F 1/1681* (2013.01); *G06F 3/0346* (2013.01); *G06F 3/04886* (2013.01); *G06F 3/165* (2013.01); *G06F 3/167* (2013.01);
(Continued)

(58) Field of Classification Search
CPC .................................................. G06F 1/1618
See application file for complete search history.

(56) References Cited

U.S. PATENT DOCUMENTS

| | | | |
|---|---|---|---|
| 9,173,287 B1* | 10/2015 | Kim | H05K 1/028 |
| 9,588,549 B2* | 3/2017 | Endo | G06F 1/1652 |
| 9,786,207 B2* | 10/2017 | Kim | G09F 9/301 |

(Continued)

*Primary Examiner* — Michael Pervan
(74) *Attorney, Agent, or Firm* — Wade IP Law LLC

(57) ABSTRACT

Techniques are described herein that are capable of making a state-based determination of information to be displayed on a screen region of a hinge that is coupled to other screen regions. For instance, a state of a hinge that is coupled between a first screen region and a second screen region may be determined. Information that is to be displayed on a third screen region that is provided on the hinge may be determine based at least in part on the state of the hinge.

20 Claims, 8 Drawing Sheets

(51) Int. Cl.
*G06F 3/16* (2006.01)
*G06F 3/01* (2006.01)

(52) U.S. Cl.
CPC .......... *G06F 3/017* (2013.01); *G06F 3/04883* (2013.01); *G06F 2203/04803* (2013.01)

(56) References Cited

U.S. PATENT DOCUMENTS

| | | | |
|---|---|---|---|
| 2014/0210740 A1* | 7/2014 | Lee | G06F 3/0488 345/173 |
| 2015/0012862 A1* | 1/2015 | Ikeda | G06F 3/0486 715/770 |
| 2015/0243202 A1* | 8/2015 | Lombardi | G09G 3/2092 345/520 |
| 2016/0041806 A1* | 2/2016 | Laaksonen | G06F 3/16 700/94 |
| 2016/0132074 A1* | 5/2016 | Kim | G06F 1/1652 715/769 |

* cited by examiner

DEVICE HAVING A SCREEN REGION ON A HINGE COUPLED BETWEEN OTHER SCREEN REGIONS

CROSS-REFERENCE TO RELATED APPLICATION(S)

This application is a continuation of U.S. patent application Ser. No. 15/347,764, filed Nov. 9, 2016 and entitled "Device Having a Screen Region on a Hinge Coupled Between Other Screen Regions," the entirety of which is incorporated by reference herein.

BACKGROUND

In modern society, people are using devices (e.g., mobile electronic devices) increasingly more in their everyday lives. For instance, people often carry devices with which they can discover information (e.g., using a digital personal assistant), perform work, and communicate with friends, coworkers, and family members. A conventional device typically has a single screen region on which information is displayed to a user of the device. Displaying all relevant information on a single screen region may cause the information to appear quite cluttered. For instance, some information may be overshadowed by other information. Accordingly, some information may be overlooked by a user of the device.

Moreover, it may be desirable for a user of the device to access information regarding multiple applications simultaneously. However, a conventional device typically displays information regarding one application at a time. Furthermore, it may be desirable for a user of the device to be able to provide input regarding applications in addition to an application with which the user is interacting on the screen region. However, a conventional device typically allows a user to provide input regarding a single application with which the user is interacting on the screen region of the device.

Devices have been developed that include an edge screen, which typically is located along a side edge of the device (i.e., perpendicular to the primary screen region of the device). However, such devices typically have a single state, which may limit utility of the edge screen.

SUMMARY

Various approaches are described herein for, among other things, making a state-based determination of information to be displayed on a screen region of a hinge that is coupled to other screen regions. The determination may be made based on any one or more of a variety of factors, including but not limited to a state of the hinge (a.k.a. the hinge state; e.g., an angle of the hinge and/or the hinge state changing from a first state to a second state), an orientation of a device that includes the hinge, a manner in which the device is held, the device being located on a surface of an object, a context of the user, an application being executed in foreground by the device, an application being executed in background by the device, a state of an operating system of the device, and a state of a user interface associated with a task that is being performed by a user of the device. Examples of information that may be displayed on the screen region include but are not limited to virtual control(s), interface element(s) (e.g., a bookmark), notification(s) (e.g., time, remaining battery power, a number of messages or calls that have been received or missed, an indication of an application that is displayed on another screen region, an indication of another device that is connected to the device, or an identity of a user (e.g., owner) of the device), instructions (e.g., to copy or move content from a screen region to another screen region), and a portion of an image that spans multiple screen regions.

In an example approach, a state of a hinge that is coupled between a first screen region and a second screen region is determined. Information is determined that is to be displayed on a third screen region that is provided on the hinge based at least in part on the state of the hinge.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
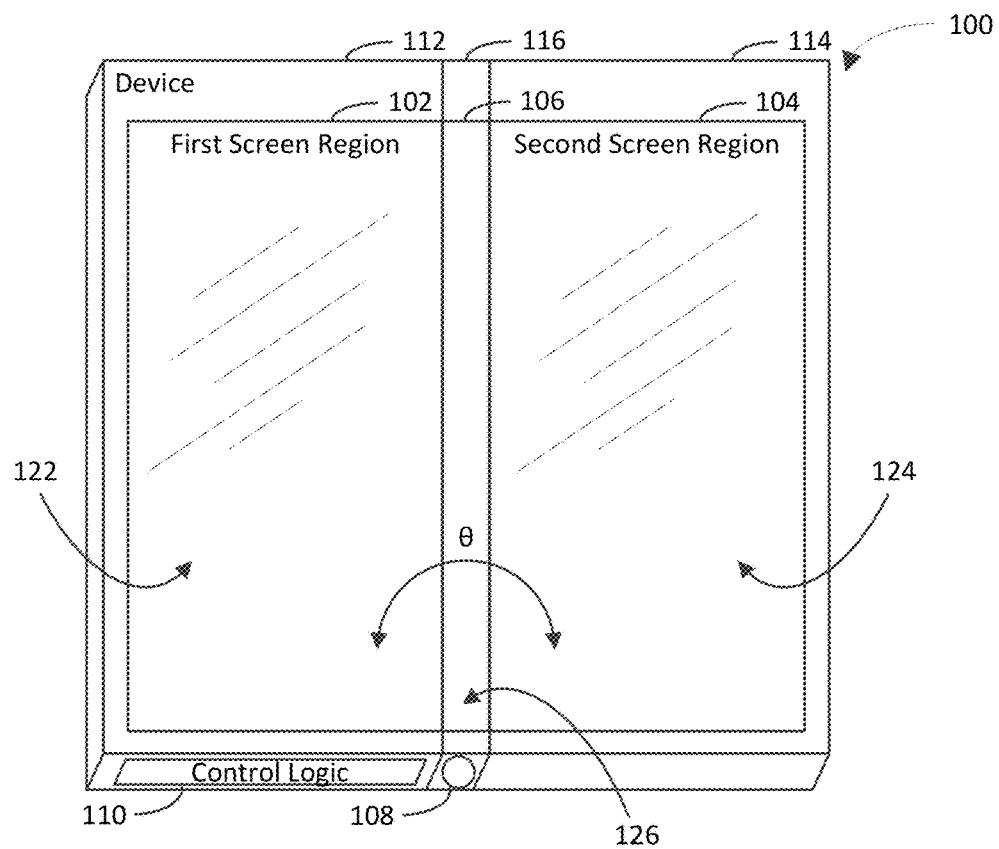
FIGS. 1-6 are views of example devices having hinges in respective states in accordance with embodiments.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of making a state-based determination of information to be displayed on a screen region of a hinge that is coupled to other screen regions. The determination may be made based on any one or more of a variety of factors, including but not limited to a state of the hinge (a.k.a. the hinge state; e.g., an angle of the hinge and/or the hinge state changing from a first state to a second state), an orientation of a device that includes the hinge, a manner in which the device is held, the device being located on a surface of an object, a context of the user, an application being executed in foreground by the device, an application being executed in background by the device, a state of an operating system of the device, and a state of a user interface associated with a task that is being performed by a user of the device. Examples of information that may be displayed on the screen region include but are not limited to virtual control(s), interface element(s) (e.g., a bookmark), notification(s) (e.g., time, remaining battery power, a number of messages or calls that have been received or missed, an indication of an application that is displayed on another screen region, an indication of another device that is connected to the device, or an identity of a user (e.g., owner) of the device), instructions (e.g., to copy or move content from a screen region to another screen region), and a portion of an image that spans multiple screen regions.

Example techniques described herein have a variety of benefits as compared to conventional techniques for displaying information to a user. For instance, the example techniques may be capable of selecting the information (e.g., the type of information) that is to be displayed on a hinge screen region depending on a state (e.g., orientation) of the hinge and/or other factor(s). A hinge screen region is a screen region that is provided (e.g., located) on a hinge. The example techniques may be capable of capturing signals regarding the state of the hinge and/or the other factor(s) and providing the signals to the operating system (OS) of a device that includes the hinge. The signals may be used to select which contextual information is to be displayed on the hinge screen region. The state of the hinge may provide an overall intent of the device. For instance, the information that is displayed on the hinge screen region may depend on the overall intent of the device. The hinge screen region may provide user interface (UI) feedback to the user in response to gestures of the user and/or the state of the hinge.

Context of the hinge may be used to select (e.g., optimize) the information that is displayed on the hinge screen region depending on the user's current intent (e.g., to increase a likelihood that the information is relevant to the user). For instance, when the device is closed (e.g., first and second screen regions that are coupled to the hinge face each other), the user may have an intent to know about notifications. When the user views the first screen region while the first and second screen regions are back-to-back (e.g., facing opposing exterior surfaces of the device) or in a tent state (e.g., facing surfaces of the device that form a reflex angle less than 360 degrees), the user may have an intent to know less global information, such as what is displayed on the second screen region, information about what is displayed on the first screen region, or which applications will be provided to the user in response to gestures. When the device is open (e.g., the first and second screen regions face the same direction), the user may have an intent for the hinge screen region to bridge the first and second screen regions together to create a continuous (e.g., seamless) display surface or to provide a visual divider between the first and second screen regions.

The example embodiments may be capable of mitigating (e.g., eliminating) clutter with regard to display of information on the device. The example techniques may enable the user to access information regarding multiple applications simultaneously. The example techniques may enable the user to be able to provide input to applications in addition to an application with which the user is interacting on a screen region.

The example techniques may reduce an amount of time and/or resources (e.g., processor, memory, network bandwidth) that are consumed to provide access to information to a user. The example embodiments may increase efficiency of a computing device that is used to provide access to information to a user. The example techniques may increase user efficiency (e.g., by reducing a number of steps that a user takes to obtain access to information and/or to provide input to an application).

FIGS. 1-6 are views of example devices 100, 200, 300, 400, 500, and 600 having hinges in respective states in accordance with embodiments. Each of the devices 100, 200, 300, 400, 500, and 600 is a processing system that is capable of determining information to be displayed on one or more screen regions. An example of a processing system is a system that includes at least one processor that is capable of manipulating data in accordance with a set of instructions. For instance, a processing system may be a computer, a personal digital assistant, or a cellular telephone.

FIG. 1 shows a device 100 having a hinge 108 that is in an open state. The device 100 further includes a first structural portion 112, a second structural portion 114, and a third structural portion 116. The first structural portion 112 provides structural support for a first screen region 102. The second structural portion 114 provides structural support for a second screen region 104. The third structural portion 116 provides structural support for a third screen region 106.

The third structural portion 116 includes the hinge 108. The hinge 108 is coupled between the first screen region 102 and the second screen region 104. For instance, the hinge 108 may be coupled to the first screen region 102 directly or via the first structural portion 112. The hinge 108 may be coupled to the second screen region 104 directly or via the second structural portion 114. Rotation of the hinge 108 causes an angle (a.k.a. hinge angle) θ between a surface of the first screen region 102 and a surface of the second screen region 104 to change. For example, rotating the hinge 108 such that the first screen region 102 rotates toward the second screen region 104 and/or such that the second screen region 104 rotates toward the first screen region 102 causes the hinge angle to decrease. Rotating the hinge 108 such that the first screen region 102 rotates away from the second screen region 104 and/or such that the second screen region 104 rotates away from the first screen region 102 causes the hinge angle to increase. The surface 122 is a viewing surface of the first screen region 102. The surface 124 is a viewing surface of the second screen region 104. A viewing surface is a surface of a screen region that is configured to be viewed (e.g., by a user of a device that includes the screen region).

The hinge 108 is shown in FIG. 1 to have a hinge angle of approximately 180 degrees in accordance with the open state. Thus, the first screen region 102 and the second screen region 104 are shown in FIG. 1 to face the same direction. For instance, the surface 122 of the first screen region 102 and the surface 124 of the second screen region 104 may be included in a common plane.

The third screen region 106 is provided on the hinge 108. For example, the third screen region 106 may be provided on (e.g., coupled to) the hinge 108 directly or via the third structural portion 116. The third screen region 106 faces the same direction as the first screen region 102 and the second screen region 104. For instance, a surface 126 of the third screen region 106 may be included in a common plane with the surface 122 of the first screen region 102 and the surface 124 of the second screen region 104. The surface 126 is a viewing surface of the third screen region 106.

The device 100 further includes control logic 110, which is configured to determine information to be displayed on any one or more of the first screen region 102, the second screen region 104, and the third screen region 106. In accordance with example embodiments described herein, control logic 110 is configured to make a state-based determination of information to be displayed on the third screen region 106. In an example implementation, control logic 110 determines a state of the hinge 108. For instance, determining the state of the hinge 108 may include determining the hinge angle θ. In accordance with this implementation, control logic 110 determines information that is to be displayed on the third screen region 106 based at least in part on the state of the hinge 108.

For example, when the hinge 108 is in the open state, as shown in FIG. 1, the control logic 110 may determine information that enables the third screen region 106 to bridge the first screen region 102 and the second screen region 104 together to provide a visually continuous (e.g., seamless) image across the first screen region 102, the second screen region 104, and the third screen region 106. In another example, the control logic 110 may determine information that enables the third screen region 106 to serve as a visual divider between the first screen region 102 and the second screen region 104. In yet another example, the control logic 110 may display a first application on the first screen region 102 and a second application on the second screen region 104. In accordance with this example, the control logic 110 may determine information, which indicates how to move interface element(s) that are related to the first application from the first screen region 102 to the second screen region 104, to be displayed on the third screen region 106. In still another example, the control logic 110 may determine information (e.g., virtual controls) that assist the user with multi-tasking (e.g., controlling multiple processes that are running on the device 100).

Figure 2:
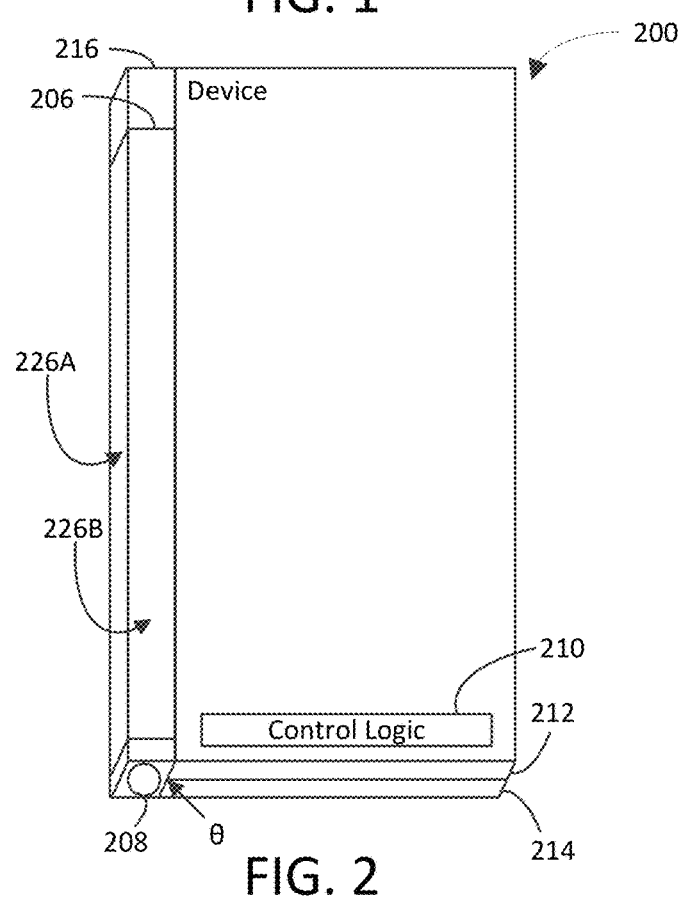

FIG. 2 shows a device 200 having a hinge 208 that is in a closed state. The device 200 further includes control logic 210, a first structural portion 212, a second structural portion 214, and a third structural portion 216, which are operable in a manner similar to the control logic 110, the first structural portion 112, the second structural portion 114, and the third structural portion 216 described above with reference to FIG. 1. The device 200 further includes first and second screen regions, which are hidden from view between the first structural portion 212 and the second structural portion 214. The hinge angle θ of the hinge 208 is approximately zero degrees in accordance with the closed state. Accordingly, the first and second screen regions face each other.

The device 200 further includes a third screen region 206, which is structurally supported by the third structural portion 216. The third screen region 206 is shown to have a side surface 226A and a front surface 226B for illustrative purposes and is not intended to be limiting. For instance, the control logic 210 may determine first information to be displayed on the side surface 226A and second information to be displayed on the front surface 226B. The second information may be the same as or different from the first information. It will be recognized that the third screen region 206 may also have a back surface, though the example embodiments are not limited in this respect. For example, the front surface 226B and the back surface may be opposing surfaces of the third screen region 206. In accordance with this example, the front surface 226B and the back surface may be substantially parallel. In another example, the control logic 210 may determine third information to be displayed on the back surface. The third information may be the same as or different from the first information and/or the second information. Some example hinge screen configurations are described in further detail with reference to FIGS. 7-10 below.

In one example, when the hinge 208 is in the closed state, as shown in FIG. 2, the control logic 210 may determine notification(s) to be displayed on the third screen region 106. In another example, the control logic 210 may determine information to be displayed on the third screen region 106 based on (e.g., based at least in part on) a determination that designated process(es) are running on the device 200.

Figure 3:
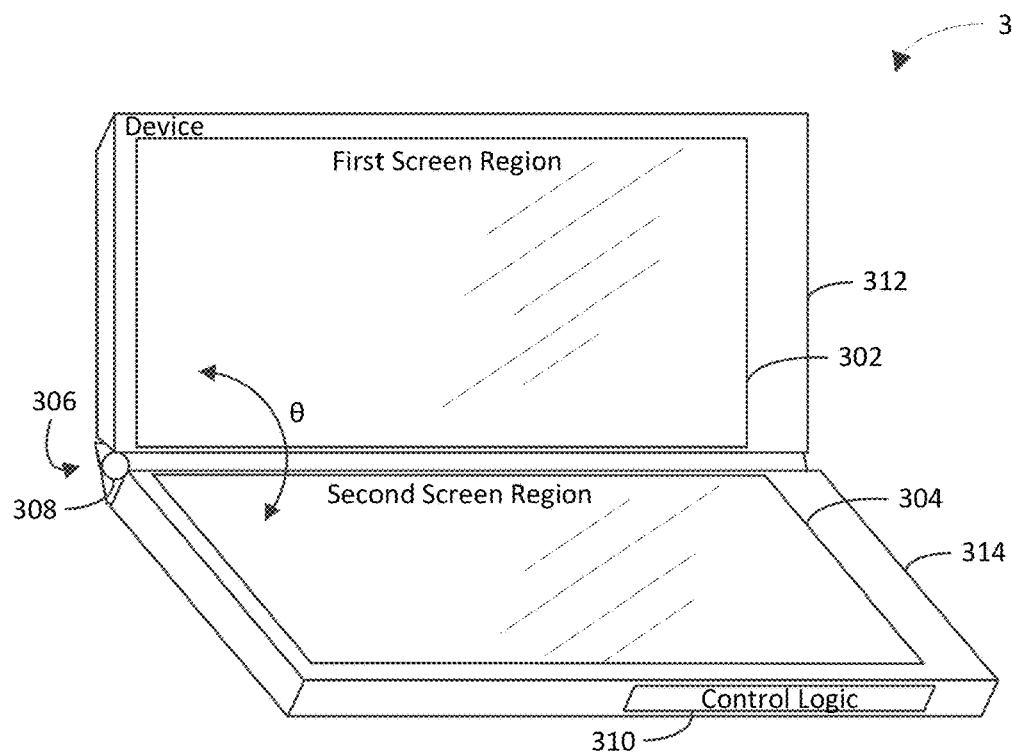

FIG. 3 shows a device 300 having a hinge 308 that is in a laptop state. The device 300 further includes a first screen region 302, a second screen region 304, a third screen region 306, control logic 310, a first structural portion 312, and a second structural portion 314, which are operable in a manner similar to the first screen region 102, the second screen region 104, the third screen region 106, the control logic 110, the first structural portion 112, and the second structural portion 114 described above with reference to FIG. 1. The device 300 is shown in FIG. 3 to not include a third structural portion for non-limiting illustrative purposes. The hinge angle θ of the hinge 308 is greater than zero degrees and less than 180 degrees in accordance with the laptop state.

In one example, when the hinge 308 is in the laptop state, as shown in FIG. 3, information that is to be displayed on the first screen region 302 and/or the second screen region 304 may be configured to be viewed with the first screen region 302 and/or the second screen region 304 being in a landscape orientation (e.g., rather than a portrait orientation) with reference to a face of a user of the device 300.

In another example, when the hinge 308 is in the laptop state, the control logic 310 may determine virtual control(s) to be displayed on the third screen region 306. In accordance with this example, at least one of the virtual control(s) may be configured to enable a user of the device 300 to provide an input to control an application that is displayed on the first screen region 102 and/or the second screen region 104.

Figure 4:
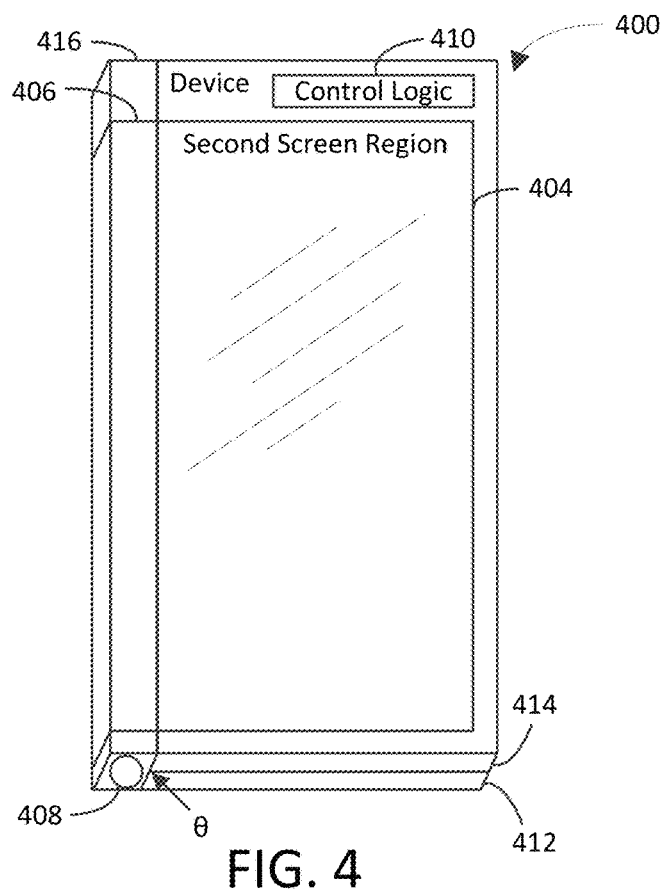

FIG. 4 shows a device 400 having a hinge 408 that is in a back-to-back state. The device 400 further includes a second screen region 404, a third screen region 406, control logic 410, a first structural portion 412, a second structural portion 414, and a third structural portion 416, which are operable in a manner similar to the second screen region 104, the third screen region 106, the control logic 110, the first structural portion 112, the second structural portion 114, and the third structural portion 116 described above with reference to FIG. 1. The device 400 further includes a first screen region, which is hidden from view on an exterior surface of the first structural portion 412. The hinge angle θ of the hinge 408 is approximately 360 degrees in accordance with the back-to-back state. Accordingly, the first screen region and the second screen region 404 face away from each other (i.e., in opposite directions). More specifically, a viewing surface of the first screen region and a viewing surface of the second screen region 404 face away from each other.

In one example, when the hinge 408 is in the back-to-back state, as shown in FIG. 4, the control logic 410 may determine information, which indicates an application that is associated with the first screen region (which is hidden from view), to be displayed on the third screen region 406.

Figure 5:
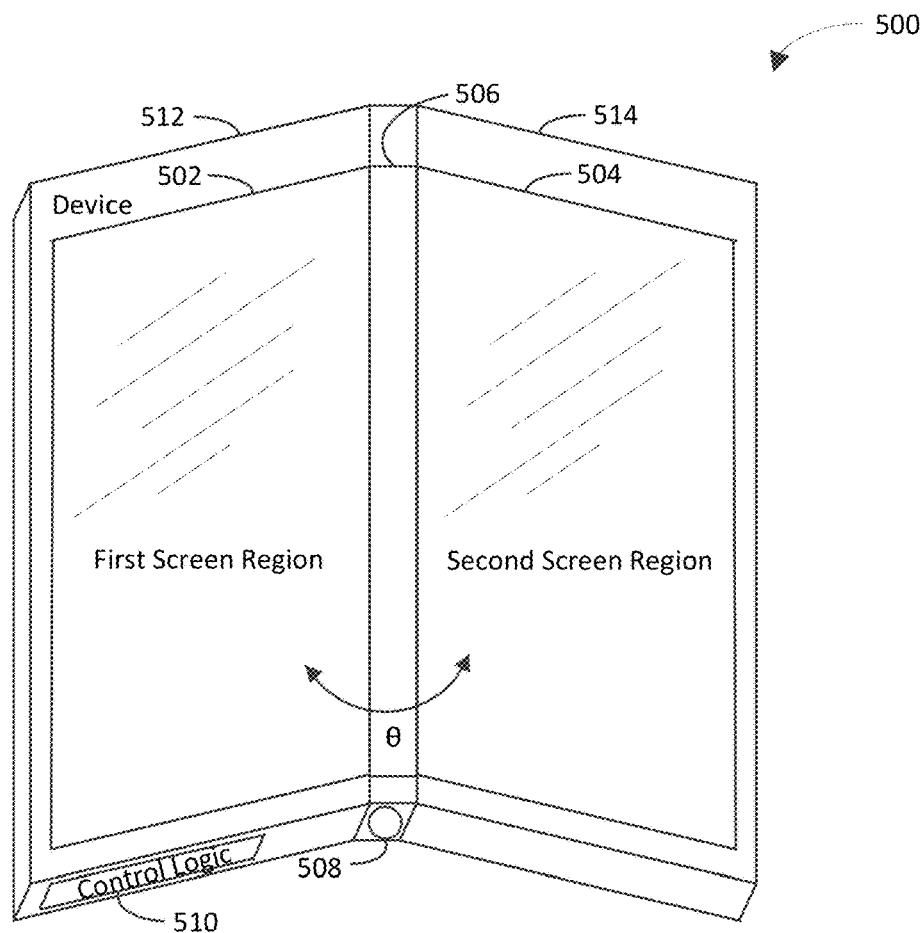

FIG. 5 shows a device 500 having a hinge 508 that is in a book state. The device 500 further includes a first screen region 502, a second screen region 504, a third screen region 506, control logic 510, a first structural portion 512, a second structural portion 514, and a third structural portion 516, which are operable in a manner similar to the first screen region 102, the second screen region 104, the third screen region 106, the control logic 110, the first structural portion 112, the second structural portion 114, and the third structural portion 116 described above with reference to FIG. 1. The hinge angle θ of the hinge 508 is greater than zero degrees and less than 180 degrees in accordance with the book state. The third screen region 506 may represent a spine of a book, though the scope of the example embodiments is not limited in this respect.

In one example, when the hinge 508 is in the book state, as shown in FIG. 5, information that is to be displayed on the first screen region 502 and/or the second screen region 504 may be configured to be viewed with the first screen region 502 and/or the second screen region 504 being in a portrait orientation (e.g., rather than a landscape orientation) with reference to a face of a user of the device 500.

In another example, when the hinge 508 is in the book state, the control logic 510 may detect a gesture that is directed to the third screen region 506. In accordance with this example, the control logic 510 may determine an interface element (e.g., a virtual bookmark) to be displayed on the third screen region 506. In another example, the control logic 510 may determine a notification to be displayed on the third screen region 506.

Figure 6:
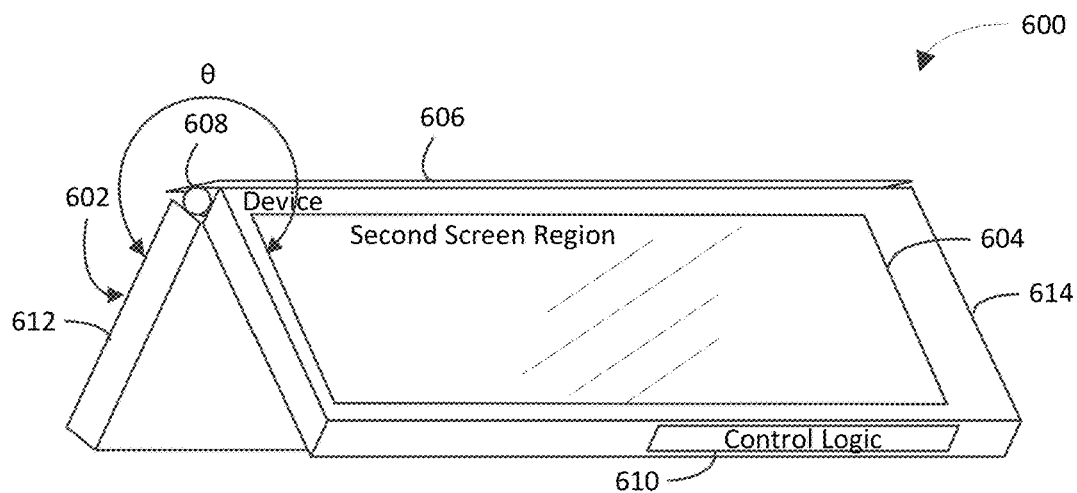

FIG. 6 shows a device 600 having a hinge 608 that is in a tent state. The device 600 further includes a first screen region 602, a second screen region 604, a third screen region 606, control logic 610, a first structural portion 612, and a second structural portion 614, which are operable in a manner similar to the first screen region 102, the second screen region 104, the third screen region 106, the control logic 110, the first structural portion 112, and the second structural portion 114 described above with reference to FIG. 1. The first screen region 602 is hidden from view behind the first structural portion 612. The device 600 is shown in FIG. 6 to not include a third structural portion for non-limiting illustrative purposes. The hinge angle θ of the hinge 608 is greater than 180 degrees and less than 360 degrees in accordance with the tent state.

In one example, when the hinge 608 is in the tent state, as shown in FIG. 6, the control logic 610 may determine a notification to be displayed on the third screen region 606. In another example, the control logic 610 may determine virtual control(s) to be displayed on the third screen region 606. In accordance with this example, a first representation of an application may be displayed on the first screen region 602, and a second representation of the application may be displayed on the second screen region 604. In further accordance with this example, at least one of the virtual control(s) may be configured to enable a first user of the first screen region 602 and a second user of the second screen region 604 to provide respective inputs that cause operations to be performed by the application. In yet another example, the control logic 610 may detect a gesture that is directed to the third screen region 606. In accordance with this example, the control logic 610 may copy or move content that is displayed on the second screen region 604 to the first screen region 602 in response to detection of the gesture. Content may include any of a variety of items, including but not limited to applications, text, virtual buttons, widgets, icons, hyperlinks, images, and videos.

The examples described above with reference to FIGS. 1-6 are not limited to the hinge states with regard to which the examples are described. It will be recognized that the examples are applicable to any suitable state of a hinge. Accordingly, any suitable information may be determined for display on any third screen region shown in FIGS. 1-6 in accordance with the example techniques described herein. Moreover, the example states described above with reference to FIGS. 1-6 are not exhaustive. It will be recognized that the example techniques are applicable to any suitable state of a hinge.

Figure 7:
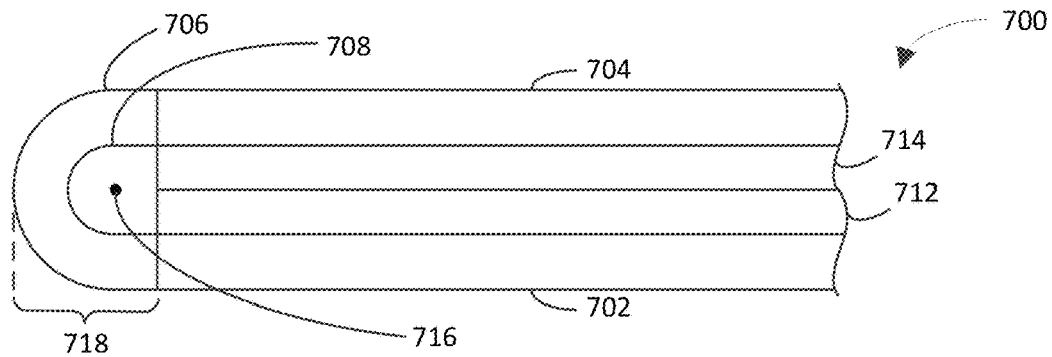
FIGS. 7-10 are side views of example devices having respective hinge screen configurations in accordance with embodiments.

FIGS. 7-10 are side views of example devices 700, 800, 900, and 1000 having respective hinge screen configurations 718, 818, 918, and 1018 in accordance with embodiments. As shown in FIG. 7, the device 700 includes a first screen region 702, a second screen region 704, a first structural portion 712, a second structural portion 714, and the hinge screen configuration 718. The hinge screen configuration 718 includes a third screen region 706 and a hinge 708. The third screen region 706 is shown to be a semicircle for non-limiting illustrative purposes. The hinge 708 has a single pivot point 716 for non-limiting illustrative purposes. Accordingly, the hinge 708 is configured to rotate about the pivot point 716.

Figure 8:
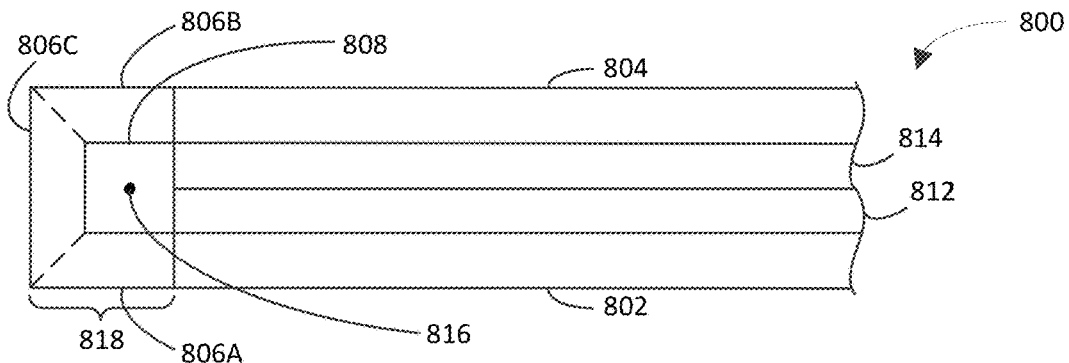

As shown in FIG. 8, the device 800 includes a first screen region 802, a second screen region 804, a first structural portion 812, a second structural portion 814, and the hinge screen configuration 818. The hinge screen configuration 818 includes a third screen region having three connected portions 806A, 806B, and 806C, which form a unitary member, and a hinge 808. A viewing surface of the first connected portion 806A and a viewing surface of the first screen region 802 face the same direction. For instance, the viewing surface of the first connected portion 806A and the viewing surface of the first screen region 802 may be in a common plane. A viewing surface of the second connected portion 806B and a viewing surface of the second screen region 804 face the same direction. For instance, the viewing surface of the second connected portion 806B and the viewing surface of the second screen region 804 may be in a common plane. A viewing surface of the third connected portion 806C is substantially perpendicular to the viewing surfaces of the respective first and second connected portions 806A and 806B. The hinge 808 has a single pivot point 816 for non-limiting illustrative purposes. Accordingly, the hinge 808 is configured to rotate about the pivot point 816.

Figure 9:
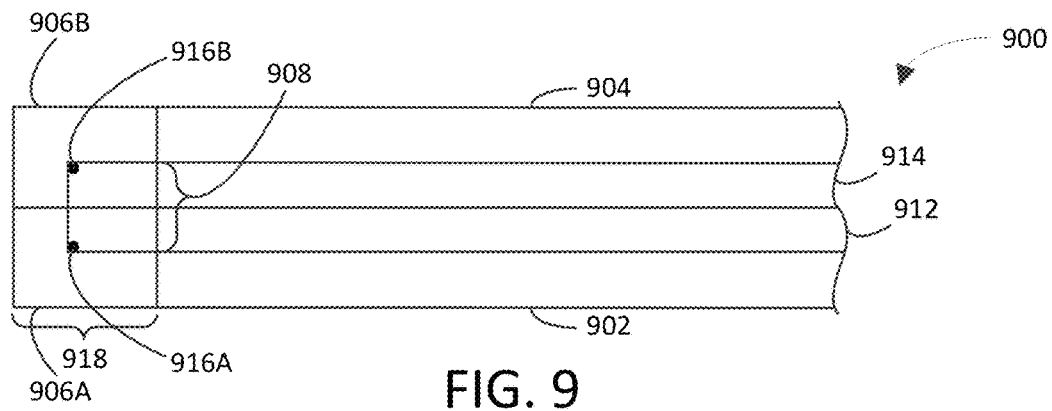

As shown in FIG. 9, the device 900 includes a first screen region 902, a second screen region 904, a first structural portion 912, a second structural portion 914, and the hinge screen configuration 918. The hinge screen configuration 918 includes a third screen region having two distinct portions 906A and 906B. The first portion 906A of the third screen region forms a right angle, such that a first segment of the viewing surface of the first portion 906A and the viewing surface of the first screen region 902 face the same direction (and may be in a common plane). A second segment of the viewing surface of the first portion 906A is substantially perpendicular to the viewing surface of the first screen region 902. The second portion 906B of the third screen region forms a right angle, such that a first segment of the viewing surface of the second portion 906B and the viewing surface of the second screen region 904 face the same direction (and may be in a common plane). A second segment of the viewing surface of the second portion 906B is substantially perpendicular to the viewing surface of the second screen region 904. The hinge 908 has two pivot points—a first pivot point 916A and a second pivot point 916B—for non-limiting illustrative purposes. A first portion of the hinge 908 rotates about the first pivot point 916A, controlling rotation of the first portion 906A of the third screen region, the first screen region 902, and the first structural portion 912 with regard to the first pivot point 916A. A second portion of the hinge 908 rotates about the second pivot point 916B, controlling rotation of the second portion 906B of the third screen region, the second screen region 904, and the second structural portion 914 with regard to the second pivot point 916B.

Figure 10:
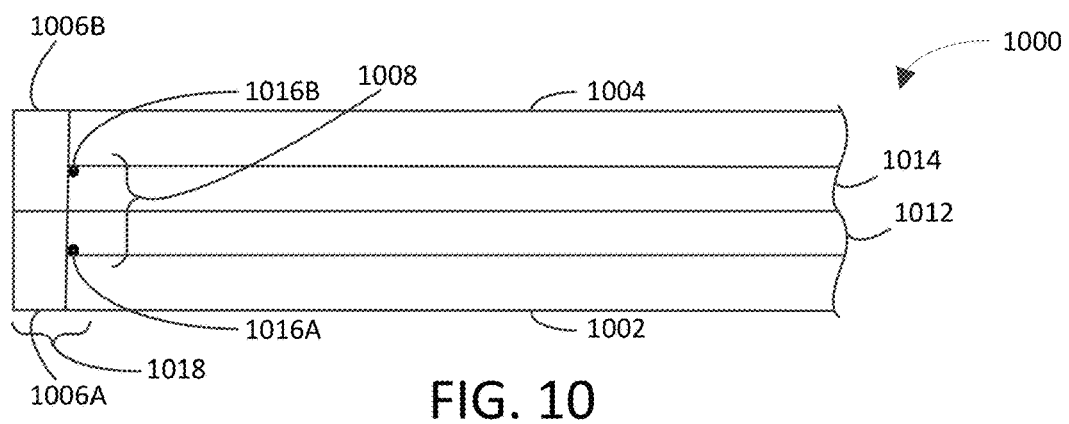

As shown in FIG. 10, the device 1000 includes a first screen region 1002, a second screen region 1004, a first structural portion 1012, a second structural portion 1014, and the hinge screen configuration 1018. The hinge screen configuration 1018 includes a third screen region having two distinct portions 1006A and 1006B. The viewing surface of the first portion 1006A is substantially perpendicular to the viewing surface of the first screen region 1002. The viewing surface of the second portion 1006B is substantially perpendicular to the viewing surface of the second screen region 1004. The hinge 1008 has two pivot points—a first pivot point 1016A and a second pivot point 1016B—for non-limiting illustrative purposes. A first portion of the hinge 1008 rotates about the first pivot point 1016A, controlling rotation of the first portion 1006A of the third screen region, the first screen region 1002, and the first structural portion 1012 with regard to the first pivot point 1016A. A second portion of the hinge 1008 rotates about the second pivot point 1016B, controlling rotation of the second portion 1006B of the third screen region, the second screen region 1004, and the second structural portion 1014 with regard to the second pivot point 1016B.

The example hinge screen configurations 718, 818, 918, and 1018 shown in respective FIGS. 7-10 are provided for illustrative purposes and are not intended to be limiting. It will be recognized that a device may include any suitable hinge configuration. Accordingly, a hinge configuration may include a third screen region that has any suitable number of portions, which may or may not be connected, and a hinge that has any suitable number of pivot points.

It will be recognized that each of the devices 100, 200, 300, 400, 500, 600, 700, 800, 900, and 1000 described above with reference to respective FIGS. 1-10 may not include one or more of the components shown therein. Furthermore, each of the devices 100, 200, 300, 400, 500, 600, 700, 800, 900, and 1000 may include components in addition to or in lieu of the components shown therein.

Example techniques for making a state-based determination of information to be displayed on a screen region of a hinge that is coupled to other screen regions are discussed in greater detail below with reference to FIGS. 11-13.

Figure 11:
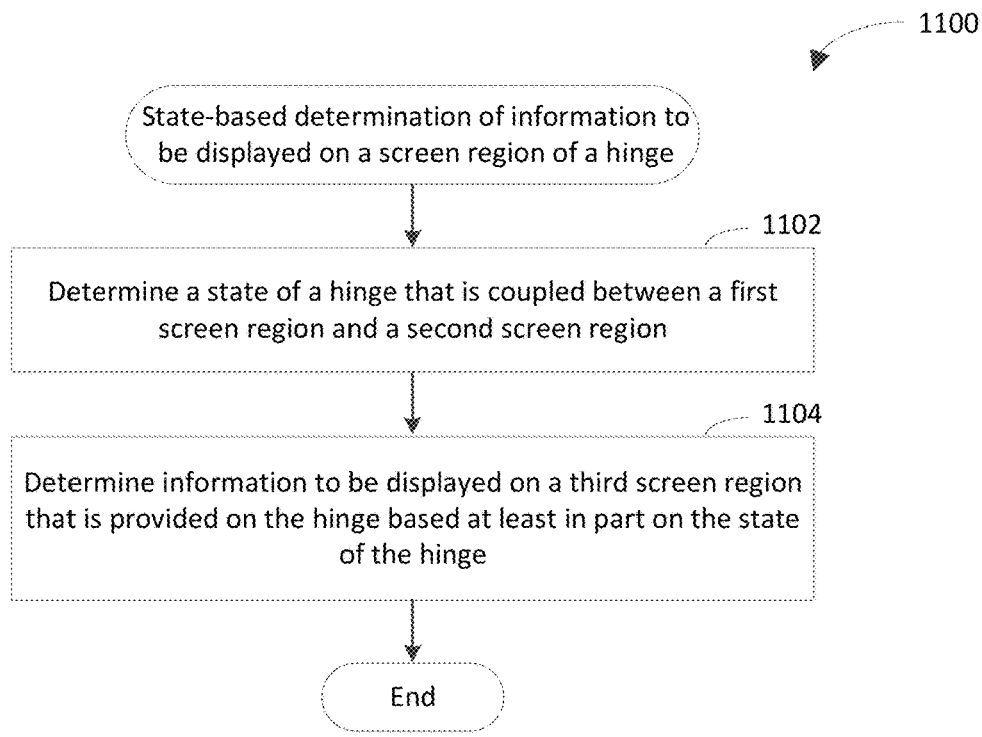
FIGS. 11-12 depict flowcharts of example methods for making a state-based determination of information to be displayed on a screen region of a hinge that is coupled to other screen regions in accordance with embodiments.

FIG. 11 depicts a flowchart 1100 of an example method for making a state-based determination of information to be displayed on a screen region of a hinge that is coupled to other screen regions in accordance with an embodiment. Flowchart 1100 may be performed by any of control logic 110, 210, 310, 410, 510, or 610 shown in respective FIGS. 1-6, for example. For illustrative purposes, flowchart 1100 is described with respect to a device 1300 shown in FIG. 13. The device 1300 includes control logic 1310, which is an example of the control logic 110, 210, 310, 410, 510, or 610, according to an embodiment. As shown in FIG. 13, device 1300 further includes a first screen region 1302, a second screen region 1304, a third screen region 1306, and a hinge 1308. The control logic 1310 includes state logic 1320, determination logic 1322, display logic 1324, gesture logic 1326, and audio logic 1328. Further structural and operational embodiments will be apparent to persons skilled in the relevant art(s) based on the discussion regarding flowchart 1100.

As shown in FIG. 11, the method of flowchart 1100 begins at step 1102. In step 1102, a state of a hinge that is coupled between a first screen region and a second screen region is determined. In an example implementation, the state logic 1320 determines a state of the hinge 1308, which is coupled between the first screen region 1302 and the second screen region 1304. For example, the state logic 1320 may review state information 1346 from the hinge 1308, the first screen region 1302, and/or the second screen region 1304 to determine the state of the hinge 1308. In accordance with this example, the state information 1346 indicates the state of the hinge 1308. For instance, the state information may indicate the angle of the hinge 1308 (i.e., the hinge angle).

Figure 13:
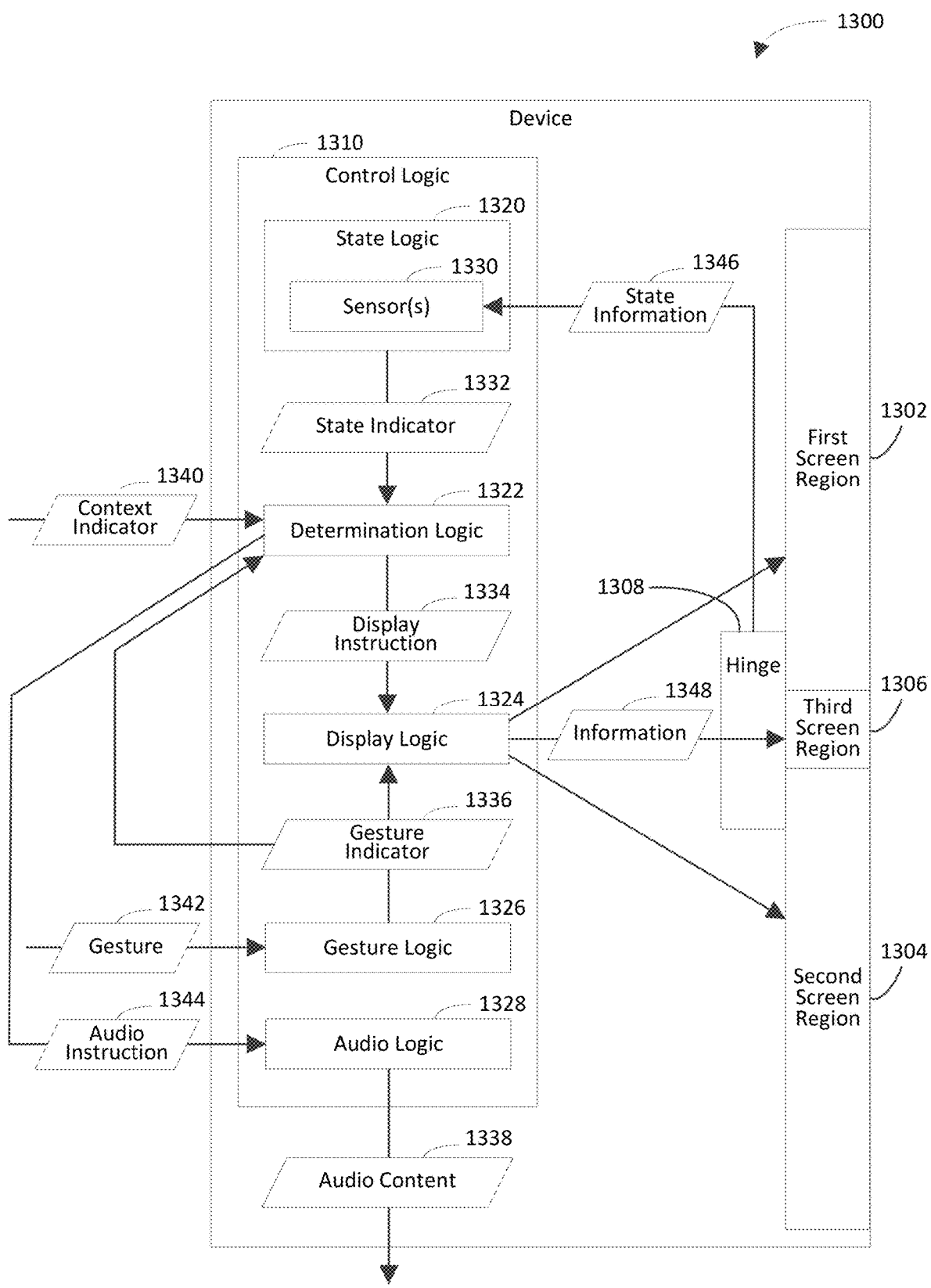
FIG. 13 is a block diagram of an example device in accordance with an embodiment.

The state logic 1320 is shown in FIG. 13 to include sensor(s) 1330 for illustrative purposes. The sensor(s) 1330 are configured to sense the state of the hinge 1308. For instance, the sensor(s) 1330 may sense the state of the hinge 1308 based at least in part on the state information 1346. Accordingly, the sensor(s) may sense the state information 1346, thereby enabling the state logic 1320 to determine the state of the hinge 1308. The sensor(s) 1330 may include any suitable type of sensor(s), including but not limited to angle sensor(s), accelerometer(s), and gyroscope(s). For example, an angle sensor may be coupled to (e.g., incorporated into) the hinge 1308 to sense the hinge angle. In accordance with this example, the state logic 1320 may determine the hinge angle in response to the angle sensor sensing the hinge angle.

In another example, a first accelerometer or gyroscope may be coupled to the first screen region 1302 to sense first orientation information (e.g., acceleration) of the first screen region 1302, and a second accelerometer or gyroscope may be coupled to the second screen region 1304 to sense second orientation information of the second screen region 1304. Accordingly, the state information 1346 may include the first orientation information and the second orientation information. In accordance with this example, the state logic 1320 may determine (e.g., infer) the hinge angle based at least in part on the first orientation information and the second orientation information. For instance, the state logic 1320 may analyze the first orientation information to determine a first angular distance traveled by the first screen region 1302 with reference to a reference angle. The state logic 1320 may analyze the second orientation information to determine a second angular distance traveled by the second screen region 1304 with reference to the reference angle. The state logic 1320 may combine (e.g., add) the first angular distance and the second angular distance to determine a cumulative angular change between the first screen region 1302 and the second screen region 1304. The state logic 1320 may combine (e.g., add) the cumulative angular change and a reference angle to determine the hinge angle. For instance, the reference angle may indicate an angle of the hinge 1308 before the cumulative angular change occurred.

In accordance with this implementation, state logic 1320 may generate a state indicator 1332 in response to determining the state of the hinge 1308. The state indicator 1332 may indicate (e.g., specify) the state of the hinge 1308.

At step 1104, information to be displayed on a third screen region that is provided on the hinge is determined based at least in part on the state of the hinge. The information to be displayed on the third screen region may include any suitable information (e.g., any suitable type of information). For example, the information may include a color and/or a pattern that indicates whether new message(s) have been received. For instance, a new message may be a message that has not yet been checked (e.g., by a user of a device that includes the first, second, and third screen regions). In accordance with this example, the color and/or the pattern may indicate a number of new messages that have been received. In another example, the information may include a color and/or a pattern that indicates whether incoming call(s) have been missed. For instance, an incoming call that has been missed may be a call that was not answered (e.g., by a user of a device that includes the first, second, and third screen regions). In accordance with this example, the color and/or the pattern may indicate a number of incoming calls that have been missed.

In an example implementation, the determination logic 1322 determines information 1348 to be displayed on the third screen region 1306 based at least in part on the state of the hinge 1308. For example, the determination logic 1322 may determine the information 1348 to be displayed on the third screen region 1306 in response to receipt of the state indicator 1332. In accordance with this example, the determination logic 1322 may determine the information 1348 based at least in part on the state indicator 1332 indicating the state of the hinge 1308. The third screen region 1306 is provided on the hinge 1308. Accordingly, the third screen region 1306 may be located between the first screen region 1302 and the second screen region 1304.

In accordance with this implementation, the determination logic 1322 may generate a display instruction 1334 in response to determining the information 1348 to be displayed on the third screen region 1306. For instance, the display instruction 1334 may instruct the display logic 1324 to display the information 1348 on the third screen region 1306.

In an example embodiment, the information is determined at step 1104 further based at least in part on a physical context a device that includes the first screen region, the second screen region, and the third screen region. For example, the determination logic 1322 may determine the information 1348 further based at least in part on a physical context of the device 1300. In accordance with this example, the context indicator 1340 may indicate the physical context of the device 1300. In further accordance with this example, the determination logic 1322 may determine the information 1348 in response to receipt of the context indicator 1340 (e.g., based at least in part on the context indicator 1340 indicating the physical context of the device 1300).

In an aspect of this embodiment, the information is determined at step 1104 further based at least in part on an orientation of the device. For example, the orientation of the device may be face-up, face-down, upright, or sideways. A face-up orientation of a device is an orientation in which a screen region with which a user of the device interacts faces away from the ground. A face-down orientation of a device is an orientation in which a screen region with which the user of the device interacts faces the ground. In an aspect, a screen region of a device may include first opposing edges and second opposing edges. In accordance with this aspect, the first opposing edges may be substantially perpendicular to the second opposing edges. In further accordance with this aspect, the first opposing edges may be longer than the second opposing edges. An upright orientation of a device is an orientation in which a surface of a screen region with which the user of the device interacts forms an angle of at least 45 degrees with reference to the ground and no greater than 135 degrees with reference to the ground and in which the first opposing edges of the screen region are in respective planes that are substantially perpendicular to the ground (e.g., the second opposing edges of the screen region are in respective planes that are substantially parallel with the ground). A sideways orientation of a device is an orientation in which a surface of a screen region with which the user of the device interacts forms an angle of at least 45 degrees with reference to the ground and no greater than 135 degrees with reference to the ground and in which the second opposing edges of the screen region are in respective planes that are substantially perpendicular to the ground (i.e., the first opposing edges of the screen region are in respective planes that are substantially parallel with the ground). In an example implementation, the determination logic 1322 determines the information based at least in part on the context indicator 1340 indicating the orientation of the device.

In another aspect of this embodiment, the information is determined at step 1104 further based at least in part on a manner in which the device is being held. For example, the device may be held in a portrait orientation (e.g., with respect to the user's face) or in a landscape orientation. In another example, the device may be held at a bottom edge of the device, at a side edge of the device, at a top edge of the device, and/or at a location corresponding to the third screen region. In an example implementation, the determination logic 1322 determines the information based at least in part on the context indicator 1340 indicating the manner in which the device is being held.

In yet another aspect of this embodiment, the information is determined at step 1104 further based at least in part on the device being located on a surface of an object. For instance, the object may be an inanimate object, such as a tabletop or a floor. In an example implementation, the determination logic 1322 determines the information based at least in part on the context indicator 1340 indicating that the device is located on the surface of the object.

In still another aspect of this embodiment, the information is determined at step 1104 further based at least in part on whether the device is in motion and/or a direction in which the device is moving (e.g., down, up, rotationally, or linearly).

In another example embodiment, the first screen region, the second screen region, and the third screen region are included in a device. In an aspect of this embodiment, the information is determined at step 1104 further based at least in part on a context of a user of the device. For instance, the context of the user may include a current or anticipated location of the user (e.g., home or work); a time at which the user performs an operation, encounters a situation, or is at a location; speech or identifying attribute(s) of a voice of the user; an interaction pattern of the user with content, device(s), and/or other person(s); a scheduled event of the user (e.g., the user currently participating in the scheduled event); a communication (e.g., a conversation) of the user; a network (e.g., a home network or a work network) that is being used by the user; the user being engaged with the device; one or more people in the user's presence; and/or one or more people with whom the user interacts. In an example implementation, the determination logic 1322 determines the information based at least in part on the context indicator 1340 indicating the context of the user.

In another aspect of this embodiment, the information is determined at step 1104 further based at least in part on a designated application being executed in foreground by the device. For example, the information may indicate a status of the designated application. In another example, the information may include virtual control(s) that are configured to enable a user of the device to control operation of the designated application. In an example implementation, the determination logic 1322 determines the information based at least in part on the context indicator 1340 indicating that the designated application is executed in the foreground by the device.

In yet another aspect of this embodiment, the information is determined at step 1104 further based at least in part on a designated application being executed in background by the device. For example, the information may indicate a status of the designated application. In another example, the information may include virtual control(s) that are configured to enable a user of the device to control operation of the designated application. In an example implementation, the determination logic 1322 determines the information based at least in part on the context indicator 1340 indicating that the designated application is executed in the background by the device.

In still another aspect of this embodiment, the information is determined at step 1104 further based at least in part on a state of an operating system of the device. For instance, the operating system may generate signal(s) indicating that the operating system has detected event(s) and/or state(s). For example, the operating system may detect that a user of the device is speaking based at least in part on a microphone detecting a voice of the user. For instance, the sensor(s) 1330 may include the microphone. In accordance with this example, the operating system may generate a signal that indicates a reaction to the voice of the user. In further accordance with this example, the determination logic 1322 may determine the information based at least in part on the signal that is received from the operating system. In another example, the operating system may detect that a call is being received by the device. In accordance with this example, the operating system may generate a signal to indicate that the call is being received. In further accordance with this example, the determination logic 1322 may determine the information based at least in part on the signal that is received from the operating system. In an example implementation, the determination logic 1322 determines the information based at least in part on the context indicator 1340 indicating the state of the operating system.

In another aspect of this embodiment, the information is determined at step 1104 further based at least in part on a state of a user interface associated with a task that is being performed by a user of the device. For example, if the user is participating in a call via the user interface, the information may be determined to include status information regarding the call. The call may be any suitable type of call, including but not limited to a phone call or a Voice over Internet protocol (VoIP) call (e.g., a Skype® call). For instance, the status information regarding the call may include a name of another person who is participating in the call, a telephone number or user identifier (ID) of the other person, and/or a duration of the call. In another example, if the user is watching and/or listening to media, the information may be determined to include status information regarding the media. For instance, the status information regarding the media may include a name of the media; a duration for which the media has played; an amount of time remaining until the media finishes playing; or a performer (e.g., actor or singer), composer, or director associated with the media. In an example implementation, the determination logic 1322 determines the information based at least in part on the context indicator 1340 indicating the state of the user interface.

In some example embodiments, one or more steps 1102 and/or 1104 of flowchart 1100 may not be performed. Moreover, steps in addition to or in lieu of steps 1102 and/or 1104 may be performed. For instance, in an example embodiment, the method of flowchart 1100 further includes displaying the information on the third screen region. For example, the information may be displayed on the third screen region in response to determining the information at step 1104. In accordance with this example, the information may be displayed on the third screen region based at least in part on the state of the hinge. In an example implementation, the display logic 1324 displays the information 1348 on the third screen region 1306. For example, the display logic 1324 may display the information 1348 on the third screen region 1306 in response to receipt of the display instruction 1334. In accordance with this example, the display logic 1324 may display the information 1348 on the third screen region 1306 based at least in part on the display instruction 1334 instructing the display logic 1324 to display the information 1348 on the third screen region 1306.

In another example embodiment, determining the state of the hinge at step 1104 includes determining a hinge angle between a first surface of the first screen region and a second surface of the second screen region. A hinge angle is an angle that is formed by a hinge. For example, the hinge angle may have a vertex at an axis about which the hinge rotates. In another example, the hinge angle may have a vertex at a midpoint between first and second pivot points of the hinge. In accordance with this embodiment, determining the information at step 1106 includes determining the information based at least in part on the hinge angle.

In an aspect of this embodiment, the method of flowchart 1100 further includes detecting a gesture that is directed to the third screen region. For instance, the gesture may be a finger swipe gesture that is directed to the third screen region along an axis of the hinge. In an example implementation, the gesture logic 1326 detects a gesture 1342 that is directed to the third screen region 1306. In accordance with this implementation, the gesture logic 1326 may generate a gesture indicator 1336 in response to detecting the gesture 1342. For instance, the gesture indicator 1336 may specify the gesture 1342.

In accordance with this aspect, determining the information at step 1104 includes determining an interface element to be displayed on the third screen region based at least in part on the hinge angle being greater than zero degrees and less than 180 degrees (e.g., in accordance with the book state) and further based at least in part on detection of the gesture. Examples of an interface element include but are not limited to text, an icon, a bookmark, and a widget. In an example implementation, the determination logic 1322 may determine the interface element to be displayed on the third screen region 1306. For instance, the determination logic 1322 may determine the interface element in response to receipt of the gesture indicator 1336 (e.g., based at least in part on the gesture indicator 1336 specifying the gesture 1342).

In another aspect of this embodiment, determining the information at step 1104 includes determining a notification to be displayed on the third screen region based at least in part on the hinge angle being either a) greater than zero degrees and less than 180 degrees (e.g., in accordance with the book state) or b) greater than 180 degrees and less than 360 degrees (e.g., in accordance with the tent state). For example, the notification may be contextual information regarding a device that includes the first screen region, the second screen region, and the third screen region. For instance, the notification may indicate an amount of battery power of the device that remains, an application that is displayed on the first screen region and/or the second screen region, or other device(s) that are connected to the device. The other device(s) may include a Bluetooth® device (e.g., headset, printer, or speaker). Each of the other device(s) may be connected wirelessly or via a wired connection. In another example, the notification may indicate a current time and/or date, a number of messages or calls that have been received or missed, a user to whom the device is assigned. For instance, the notification may indicate an owner of the device.

In yet another aspect of this embodiment, determining the information at step 1104 includes determining virtual control(s) to be displayed on the third screen region based at least in part on the hinge angle being greater than 180 degrees and less than 360 degrees (e.g., in accordance with the tent state). In accordance with this aspect, at least one virtual control is configured to enable a first user of the first screen region and a second user of the second screen region to provide respective inputs that cause operations to be performed by an application of which a first representation is displayed on the first screen region and a second representation is displayed on the second screen region. For example, at least one virtual control may be configured to enable the first user and/or the second user to synchronize a state of the first representation and a state of the second representation. For instance, at least one virtual control may be configured to enable the first user and/or the second user to watch the same video or temporally align the video in each of the first and second representations. In another example, at least one virtual control may be configured to enable the first user and/or the second user to de-synchronize a state of the first representation and a state of the second representation. For instance, the first representation and the second representation may include a common video. At least one virtual control may be configured to enable the first user to pause the video in the first representation while the second user continues to watch the video in the second representation. At least one virtual control may be configured to enable the first user to replace the video in the first representation with another video, while the second user continues to watch the video in the second representation.

In still another aspect of this embodiment, the method of flowchart 1100 further includes detecting a gesture that is directed to the third screen region. In an example implementation, the gesture logic 1326 detects a gesture 1342 that is directed to the third screen region 1306. In accordance with this implementation, the gesture logic 1326 may generate a gesture indicator 1336 in response to detecting the gesture 1342. For instance, the gesture indicator 1336 may specify the gesture 1342. In accordance with this aspect, the method of flowchart 1100 further includes copying or moving content (e.g., a digital photograph) that is displayed on the first screen region to the second screen region based at least in part on the hinge angle being greater than 180 degrees and less than 360 degrees (e.g., in accordance with the tent state) and further based at least in part on detection of the gesture. In an example implementation, display logic 1324 copies or moves the content that is displayed on the first screen region 1302 to the second screen region 1304. For instance, the display logic 1324 may copy or move the content in response to receipt of the gesture indicator 1336 (e.g., based at least in part on the gesture indicator 1336 specifying the gesture 1342).

In one example of this aspect, the method of flowchart 1100 further includes selecting the content based at least in part on receipt of a user command that indicates that the content is to be selected. For instance, the determination logic may select the content based at least in part on receipt of the user command. The determination logic 1322 may generate the display instruction 1334 to indicate that the content is selected. In accordance with this example, the content may be copied or moved in response to the content being selected. For instance, the display logic 1324 may copy or move the content in response to receipt of the display instruction 1334 (e.g., based at least in part on the display instruction 1334 indicating that the content is selected).

In another aspect of this embodiment, determining the information at step 1104 includes determining virtual control(s) to be displayed on the third screen region based at least in part on the hinge angle being either (a) greater than zero degrees and less than 180 degrees (e.g., in accordance with the laptop state) or (b) approximately 360 degrees (e.g., in accordance with the back-to-back state). In accordance with this aspect, at least one virtual control is configured to enable a user of a device that includes the first screen region, the second screen region, and the third screen region to provide an input to control an application that is displayed on the first screen region and/or the second screen region. Examples of an application include but are not limited to a game, a calendar application, a phone application, a messaging (e.g., email, instant message (IM), or short message service (SMS) message) application, a social networking application, and a document (e.g., photo, video, word processing document, or spreadsheet) editing application.

In accordance with this aspect, the method of flowchart 1100 may further include displaying the at least one virtual control based at least in part on initiation of the application. For instance, the display logic 1324 may display the at least one virtual control based at least in part on the initiation of the application. In further accordance with this aspect, the method of flowchart 1100 may further include discontinuing display of the at least one virtual control based at least in part on termination of the application. For instance, the display logic 1324 may discontinue display of the at least one virtual control based at least in part on the termination of the application.

In yet another aspect of this embodiment, determining the information at step 1104 includes determining a portion of an image to be displayed on the third screen region based at least in part on the hinge angle being approximately 180 degrees (e.g., in accordance with the open state). In accordance with this aspect, the method of flowchart 1100 further includes displaying the image such that the image spans the first screen region, the second screen region, and the third screen region based at least in part on the hinge angle being approximately 180 degrees. For instance, the display logic 1324 may display the image such that the image spans the first screen region 1302, the second screen region 1304, and the third screen region 1306 based at least in part on the hinge angle being approximately 180 degrees.

In still another aspect of this embodiment, the method of flowchart 1100 further includes displaying a first application on the first screen region. For instance, the display logic 1324 may display the first application on the first screen region 1302. In accordance with this aspect, the method of flowchart 1100 further includes displaying a second application that is different from the first application on the second screen region. For instance, the display logic 1324 may display the second application on the second screen region 1304. In further accordance with this aspect, determining the information at step 1104 includes determining the information, which indicates how to move interface element(s) that are related to the first application from the first screen region to the second screen region, to be displayed on the third screen region based at least in part on the hinge angle being approximately 180 degrees (e.g., in accordance with the open state).

For example, the information may include an arrow that points toward the second screen region to indicate that the interface element(s) may be dragged across the third screen region from the first screen region to the second screen region. In another example, the information may be determined at step 1304 in response to (e.g., based at least in part on) a determination that at least one of the interface elements is dragged from a first location on the first screen region to a second location on the first screen region.

In another aspect of this embodiment, the method of flowchart 1100 further includes displaying a first application on the first screen region. For instance, the display logic 1324 may display the first application on the first screen region 1302. In accordance with this aspect, determining the information at step 1104 includes determining the information, which indicates a second application that is different from the first application and that is associated with the second screen region, to be displayed on the third screen region based at least in part on the hinge angle being approximately 360 degrees (e.g., in accordance with the back-to-back state). In further accordance with this aspect, the method of flowchart 1100 may further include displaying the second application on the second screen region. For instance, the display logic 1324 may display the second application on the second screen region 1304.

In yet another aspect of this embodiment, determining the information at step 1104 includes determining a notification to be displayed on the third screen region based at least in part on the hinge angle being approximately zero degrees (e.g., in accordance with the closed state). For example, the notification may be contextual information regarding a device that includes the first screen region, the second screen region, and the third screen region. For instance, the notification may indicate an amount of battery power of the device that remains, an application that is displayed on the first screen region and/or the second screen region, or other device(s) that are connected to the device. In another example, the notification may indicate a current time and/or date, a number of messages or calls that have been received or missed, a user to whom the device is assigned. For instance, the notification may indicate an owner of the device.

In still another aspect of this embodiment, determining the information at step 1104 includes determining the information based at least in part on the hinge angle being approximately zero degrees (e.g., in accordance with the closed state) and further based at least in part on process(es) (e.g., application(s)) being executed by a device that includes the first screen region, the second screen region, and the third screen region. For example, the information may include a notification regarding at least one of the process(es). In accordance with this example, the notification may indicate a time of day determined by a clock application. The notification may identify audio content (e.g., a track) that is being played by an audio (e.g., music) application or a video (e.g., movie) that is being played by a video application. The notification may indicate a status of audio content that is being played by an audio application or a video that is being played by a video application. For instance, the notification may indicate an amount of the audio content that has been played by the audio application or an amount of the video that has been played by the video application. The notification may indicate that an incoming call is being received. For instance, the incoming call may be a phone call or a Voice over Internet protocol (VoIP) call (e.g., a Skype® call). The notification may identify a person with whom a call is being conducted. In another example, the information may indicate a response by a digital personal assistant to a request that is received from a user of the device.

In yet another example, the information may include virtual control(s) that are configured to enable a user of the device to control operation of at least one of the process(es). For instance, at least one of the virtual control(s) may enable the user of the device to respond to a received message without opening the device in response to the device being in a closed state defined by the hinge angle being approximately zero degrees. At least one of the virtual control(s) may enable the user of the device to proceed to a next audio or video file (e.g., song or movie) in a playlist, go back to a previous audio or video file in a playlist, and/or adjust volume of playback of the audio or video file.

In an aspect of this example, the method of flowchart 1100 may further include displaying the virtual control(s) on the third screen region in response to (e.g., based at least in part on) the state of the hinge changing from a first state in which the hinge angle is greater than zero degrees to a second state in which the hinge angle is approximately zero degrees. In accordance with this aspect, the virtual control(s) that are displayed on the third screen region may be a limited (e.g., miniaturized or minimized) version of virtual control(s) that were displayed on the first screen region and/or the second screen region while the hinge was in the first state. For instance, the virtual control(s) that are displayed on the third screen region may be a subset (i.e., fewer than all) of the virtual control(s) that were displayed on the first screen region and/or the second screen region while the hinge was in the first state.

In yet another example embodiment, the method of flowchart 1100 further includes determining (e.g., detecting) that content is dragged from the first screen region to the third screen region. In an example implementation, the determination logic 1322 determines that the content is dragged from the first screen region 1302 to the third screen region 1306. For instance, the determination logic 1322 may determine that the content is dragged from the first screen region 1302 to the third screen region 1306 in response to receipt of the context indicator 1340 (e.g., based at least in part on the context indicator 1340 indicating that the content is dragged from the first screen region 1302 to the third screen region 1306. In accordance with this embodiment, the method of flowchart 1100 further includes providing the content as an input to an application (e.g., a clipboard application) that is associated with the third screen region based at least in part on the content being dragged from the first screen region to the third screen region. For instance, the application may be executed in background of a device that includes the first screen region, the second screen region, and the third screen region. In an example implementation, the determination logic 1322 may provide the content as an input to an application that is associated with the third screen region 1306 based at least in part on the content being dragged from the first screen region 1302 to the third screen region 1306.

In still another example embodiment, determining the information at step 1104 includes determining virtual control(s) to be displayed on the third screen region based at least in part on the state of the hinge. In accordance with this embodiment, at least one of the virtual control(s) is configured to enable a user of the device to control a process that is executed (e.g., that is being executed) by the device. For example, a virtual control may be configured to enable the user to answer an incoming call, to hang up an incoming call, and/or to forward an incoming call to voicemail. In accordance with this example, the method of flowchart 1100 may further include displaying the virtual control based at least in part on detection of the incoming call. For instance, the display logic 1324 may display the virtual control on the third screen region 1306 based at least in part on detection of the incoming call. In further accordance with this embodiment, the method of flowchart 1100 may further include discontinuing display of the virtual control based at least in part on detection that the incoming call is ended (e.g., hung up or sent to voicemail). For instance, the display logic 1324 may discontinue the display of the virtual control on the third screen region 1306 based at least in part on detection that the incoming call is ended.

In another example, a virtual control may be configured to enable the user to control playback of an audio file (e.g., song) or a video file (e.g., movie). In accordance with this example, the method of flowchart 1100 may further include displaying the virtual control based at least in part on selection of the audio file or the video file. For instance, the display logic 1324 may display the virtual control on the third screen region 1306 based at least in part on the selection of the audio file or the video file. In further accordance with this example, the method of flowchart 1100 may further include discontinuing display of the virtual control based at least in part on the playback of the audio file or the video file ending. For instance, the display logic 1324 may discontinue the display of the virtual control on the third screen region 1306 based at least in part on the playback of the audio file or the video file ending.

At least one of the virtual control(s) may be configured to initiate audio and/or haptic feedback in response to the respective virtual control being utilized (e.g., based at least in part on the respective virtual control being touched by the user). For instance, the audio and/or haptic feedback may serve as an audible and/or tactile indication to the user that the virtual control is being used to control the process that is executed by the device.

Figure 12:
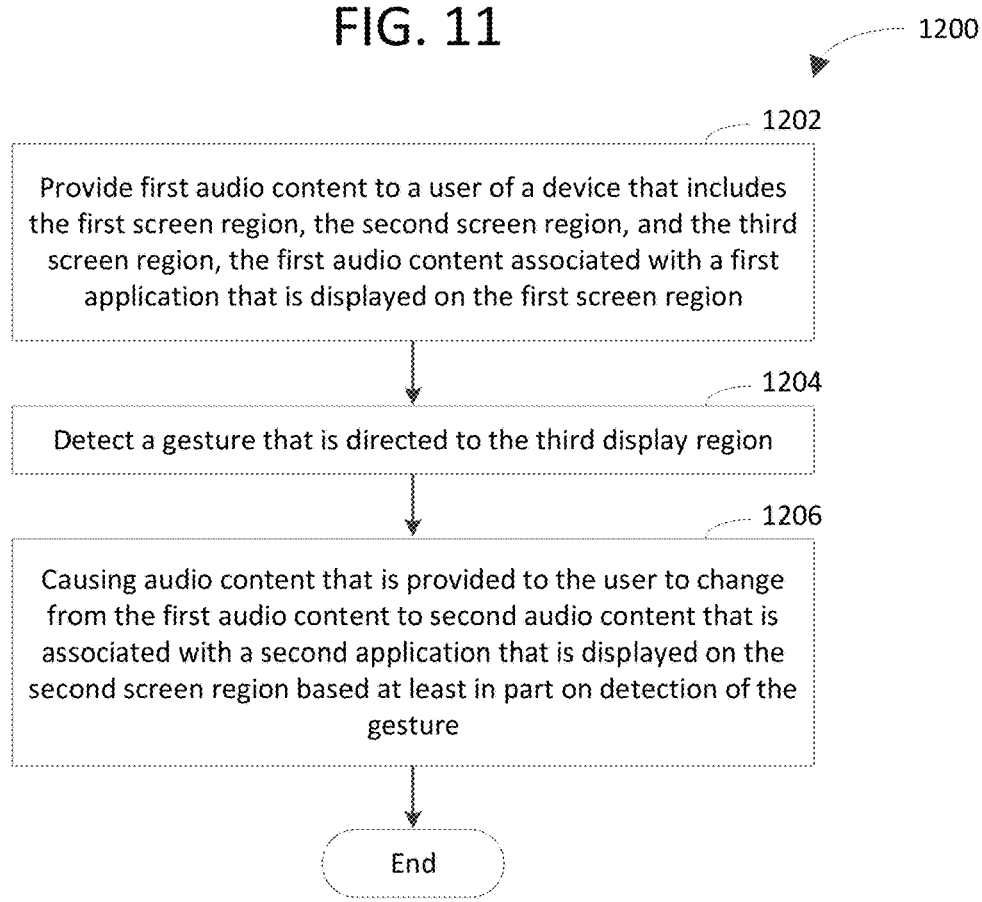

In another example embodiment, the method of flowchart 1100 includes one or more of the steps shown in flowchart 1200 of FIG. 12. As shown in FIG. 12, the method of flowchart 1200 begins at step 1202. In step 1202, first audio content is provided to a user of a device that includes the first screen region, the second screen region, and the third screen region. The first audio content is associated with a first application that is displayed on the first screen region. In an example implementation, the audio logic 1328 provides first audio content to a user of the device 1300. In accordance with this implementation, the first audio content is associated with the first application, which is displayed on the first screen region 1302.

At step 1204, a gesture that is directed to the third display region is detected. In an example implementation, the gesture logic 1326 detects the gesture 1342 that is directed to the third display region 1306. In accordance with this implementation, the gesture logic 1326 may generate the gesture indicator 1336 in response to detecting the gesture 1342.

At step 1206, audio content that is provided to the user is caused to change from the first audio content to second audio content that is associated with a second application that is displayed on the second screen region based at least in part on detection of the gesture. In an example implementation, the determination logic 1322 causes the audio content 1338 that is provided to the user to change from the first audio content to the second audio content that is associated with the second application that is displayed on the second screen region 1304 based at least in part on detection of the gesture 1342. For instance, the determination logic 1322 may cause the audio content 1338 to change in response to receipt of the gesture indicator 1336 (e.g., based at least in part on the gesture indicator 1336 indicating the gesture 1342). In accordance with this implementation, the determination logic 1322 may generate an audio instruction 1344 that instructs the audio logic 1328 to change the audio content 1338 from the first audio content to the second audio content. In further accordance with this implementation, the audio logic 1328 may change the audio content 1338 from the first audio content to the second audio content based at least in part on the detection of the gesture 1342. For instance, the audio logic 1328 may stop providing the first audio content to the user and start providing the second audio content to the user in response to receipt of the audio instruction 1344 (e.g., based at least in part on the audio instruction 1344 instructing the audio logic 1328 to change the audio content 1338 from the first audio content to the second audio content).

In an example embodiment, the audio content that is provided to the user may be caused to change from the first audio content to the second audio content further based at least in part on a hinge angle between a first surface of the first screen region and a second surface of the second screen region being greater than 180 degrees and less than 360 degrees (e.g., in accordance with the tent state). In one example, the hinge angle may have a vertex at an axis about which the hinge rotates. In another example, the hinge angle may have a vertex at a midpoint between first and second pivot points of the hinge.

It will be recognized that the device 1300 may not include one or more of the first screen region 1302, the second screen region 1304, the third screen region 1306, the control logic 1310, the state logic 1320, the determination logic 1322, the display logic 1324, the gesture logic 1326, and/or the audio logic 1328. Furthermore, the device 1300 may include components in addition to or in lieu of the first screen region 1302, the second screen region 1304, the third screen region 1306, the control logic 1310, the state logic 1320, the determination logic 1322, the display logic 1324, the gesture logic 1326, and/or the audio logic 1328.

Any of the screen regions described above with reference to FIGS. 1-10 and 13 may include touch and/or hover functionality. Touch functionality enables a screen region to sense objects that physically touch the screen region. Hover functionality enables a screen region to sense objects that are placed proximate the screen region (e.g., a spaced distance from the screen region and/or without touching the screen region).

Moreover, some of the embodiments discussed above with reference to FIGS. 1-13 are described with reference to a particular hinge state for illustrative purposes and are not intended to be limiting. It will be recognized that the embodiments described herein are applicable to any suitable hinge state. Accordingly, any suitable information may be determined to be displayed on a third screen region based at least in part on any suitable hinge state (e.g., based at least in part on the hinge state changing from any suitable first hinge state to any suitable second hinge state).

Figure 14:
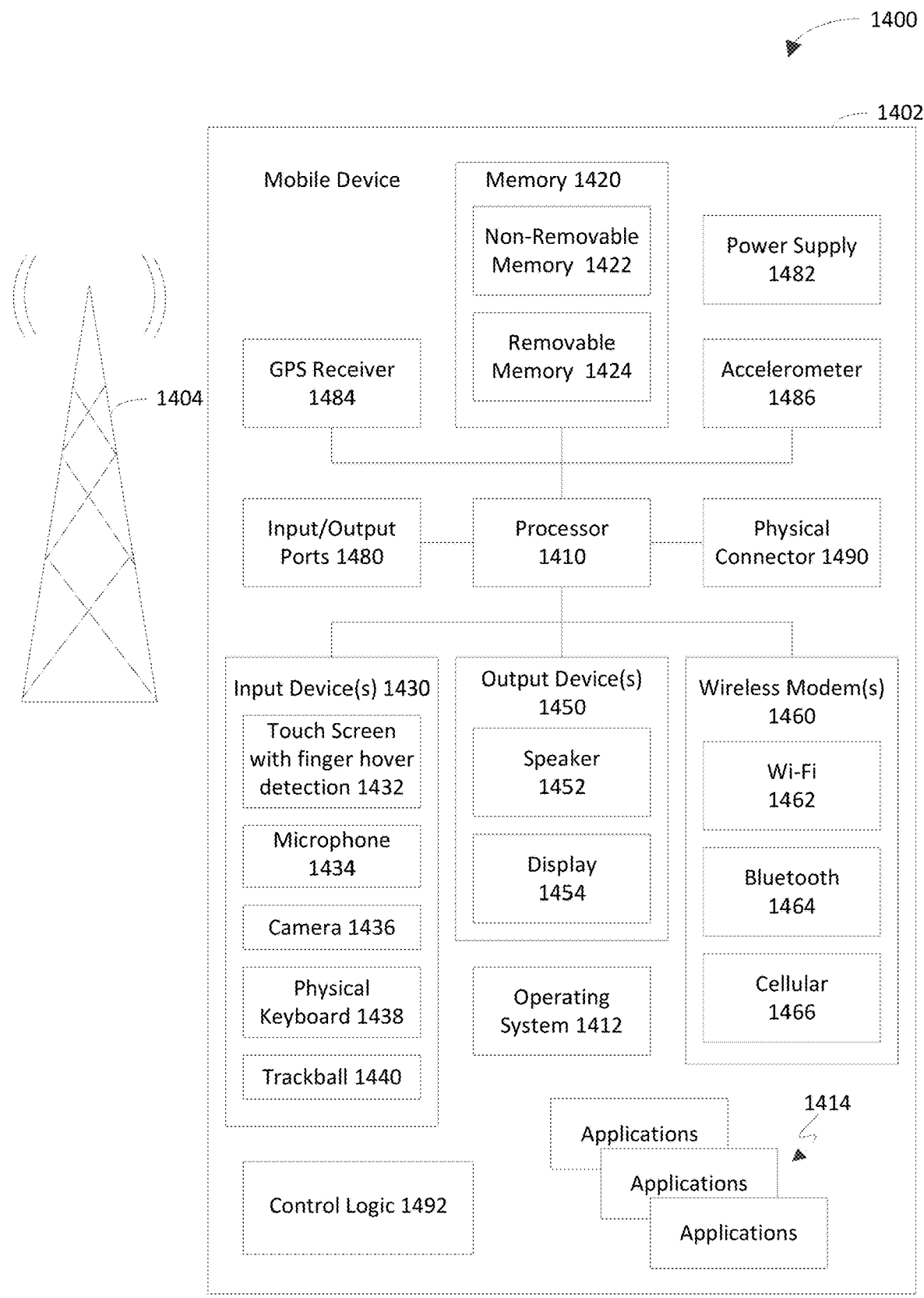
FIG. 14 is a system diagram of an exemplary mobile device in accordance with an embodiment.

FIG. 14 is a system diagram of an exemplary mobile device 1400 including a variety of optional hardware and software components, shown generally as 1402. Any components 1402 in the mobile device may communicate with any other component, though not all connections are shown, for ease of illustration. The mobile device 1400 may be any of a variety of computing devices (e.g., cell phone, smartphone, handheld computer, Personal Digital Assistant (PDA), etc.) and may allow wireless two-way communications with one or more mobile communications networks 1404, such as a cellular or satellite network, or with a local area or wide area network.

The mobile device 1400 may include a processor 1410 (e.g., signal processor, microprocessor, ASIC, or other control and processing logic circuitry) for performing such tasks as signal coding, data processing, input/output processing, power control, and/or other functions. An operating system 1412 may control the allocation and usage of the components 1402 and support for one or more applications 1414 (a.k.a. application programs). The applications 1414 may include common mobile computing applications (e.g., email applications, calendars, contact managers, web browsers, messaging applications) and any other computing applications (e.g., word processing applications, mapping applications, media player applications).

The mobile device 1400 may include memory 1420. Memory 1420 may include non-removable memory 1422 and/or removable memory 1424. The non-removable memory 1422 may include RAM, ROM, flash memory, a hard disk, or other well-known memory storage technologies. The removable memory 1424 may include flash memory or a Subscriber Identity Module (SIM) card, which is well known in GSM communication systems, or other well-known memory storage technologies, such as "smart cards." Memory 1420 may store data and/or code for running the operating system 1412 and the applications 1414. Example data may include web pages, text, images, sound files, video data, or other data sets to be sent to and/or received from one or more network servers or other devices via one or more wired or wireless networks. Memory 1420 may store a subscriber identifier, such as an International Mobile Subscriber Identity (IMSI), and an equipment identifier, such as an International Mobile Equipment Identifier (IMEI). Such identifiers may be transmitted to a network server to identify users and equipment.

The mobile device 1400 may support one or more input devices 1430, such as a touch screen 1432, microphone 1434, camera 1436, physical keyboard 1438 and/or trackball 1440 and one or more output devices 1450, such as a speaker 1452 and a display 1454. Touch screens, such as touch screen 1432, may detect input in different ways. For example, capacitive touch screens detect touch input when an object (e.g., a fingertip) distorts or interrupts an electrical current running across the surface. As another example, touch screens may use optical sensors to detect touch input when beams from the optical sensors are interrupted. Physical contact with the surface of the screen is not necessary for input to be detected by some touch screens. For example, the touch screen 1432 may support a finger hover detection using capacitive sensing, as is well understood in the art. Other detection techniques may be used, including camera-based detection and ultrasonic-based detection. To implement a finger hover, a user's finger is typically within a predetermined spaced distance above the touch screen, such as between 0.1 to 0.25 inches, or between 0.25 inches and 0.05 inches, or between 0.5 inches and 0.75 inches, or between 0.75 inches and 1 inch, or between 1 inch and 1.5 inches, etc.

The mobile device 1400 may include control logic 1492. The control logic 1492 is configured to make a state-based determination of information to be displayed on a screen region of a hinge that is coupled to other screen regions in accordance with any one or more of the techniques described herein.

Other possible output devices (not shown) may include piezoelectric or other haptic output devices. Some devices may serve more than one input/output function. For example, touch screen 1432 and display 1454 may be combined in a single input/output device. The input devices 1430 may include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 1412 or applications 1414 may include speech-recognition software as part of a voice control interface that allows a user to operate the device 1400 via voice commands. Furthermore, the device 1400 may include input devices and software that allows for user interaction via a user's spatial gestures, such as detecting and interpreting gestures to provide input to a gaming application.

Wireless modem(s) 1460 may be coupled to antenna(s) (not shown) and may support two-way communications between the processor 1410 and external devices, as is well understood in the art. The modem(s) 1460 are shown generically and may include a cellular modem 1466 for communicating with the mobile communication network 1404 and/or other radio-based modems (e.g., Bluetooth 1464 and/or Wi-Fi 1462). At least one of the wireless modem(s) 1460 is typically configured for communication with one or more cellular networks, such as a GSM network for data and voice communications within a single cellular network, between cellular networks, or between the mobile device and a public switched telephone network (PSTN).

The mobile device may further include at least one input/output port 1480, a power supply 1482, a satellite navigation system receiver 1484, such as a Global Positioning System (GPS) receiver, an accelerometer 1486, and/or a physical connector 1490, which may be a USB port, IEEE 1394 (FireWire) port, and/or RS-232 port. The illustrated components 1402 are not required or all-inclusive, as any components may be deleted and other components may be added as would be recognized by one skilled in the art.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the control logic 110, the control logic 210, the control logic 310, the control logic 410, the control logic 510, the control logic 610, the control logic 1310, the state logic 1320, the determination logic 1322, the display logic 1324, the gesture logic 1326, the audio logic 1328, the control logic 1492, flowchart 1100, and/or flowchart 1200 may be implemented in hardware, software, firmware, or any combination thereof.

For example, any one or more of the control logic 110, the control logic 210, the control logic 310, the control logic 410, the control logic 510, the control logic 610, the control logic 1310, the state logic 1320, the determination logic 1322, the display logic 1324, the gesture logic 1326, the audio logic 1328, the control logic 1492, flowchart 1100, and/or flowchart 1200 may be implemented as computer program code configured to be executed in one or more processors.

In another example, any one or more of the control logic 110, the control logic 210, the control logic 310, the control logic 410, the control logic 510, the control logic 610, the control logic 1310, the state logic 1320, the determination logic 1322, the display logic 1324, the gesture logic 1326, the audio logic 1328, the control logic 1492, flowchart 1100, and/or flowchart 1200 may be implemented as hardware logic/electrical circuitry.

For instance, in an embodiment, one or more of the control logic 110, the control logic 210, the control logic 310, the control logic 410, the control logic 510, the control logic 610, the control logic 1310, the state logic 1320, the determination logic 1322, the display logic 1324, the gesture logic 1326, the audio logic 1328, the control logic 1492, flowchart 1100, and/or flowchart 1200 may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Example Computer System

Figure 15:
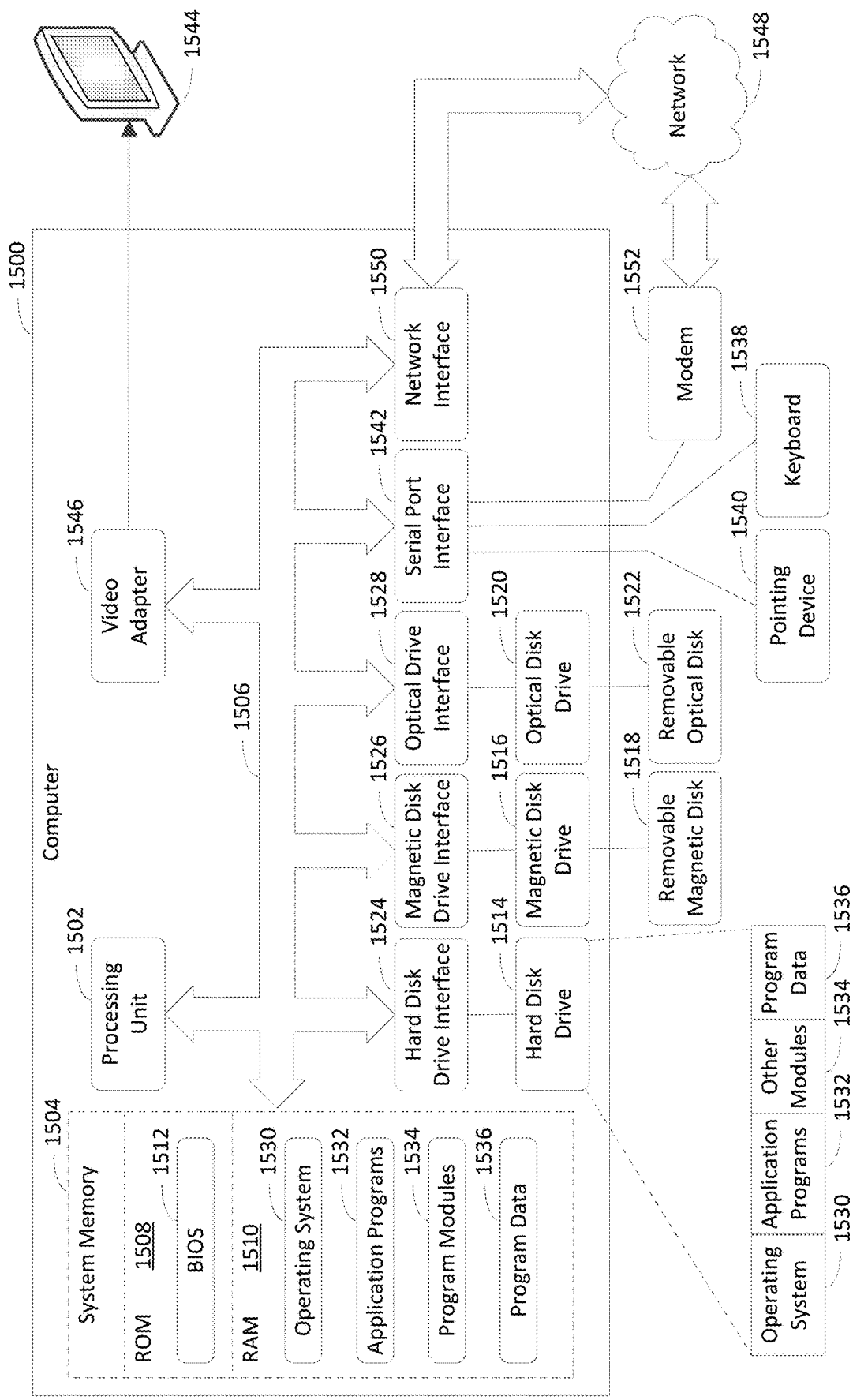
FIG. 15 depicts an example computer in which embodiments may be implemented.

FIG. 15 depicts an example computer 1500 in which embodiments may be implemented. For instance, any one or more of devices 100, 200, 300, 400, 500, 600, 700, 800, 900, 1000, and 1300 shown in respective FIGS. 1-10 and 13 and/or mobile device 1400 shown in FIG. 14 may be implemented using computer 1500, including one or more features of computer 1500 and/or alternative features. Computer 1500 may be a general-purpose computing device in the form of a conventional personal computer, a mobile computer, or a workstation, for example, or computer 1500 may be a special purpose computing device. The description of computer 1500 provided herein is provided for purposes of illustration, and is not intended to be limiting. Embodiments may be implemented in further types of computer systems, as would be known to persons skilled in the relevant art(s).

As shown in FIG. 15, computer 1500 includes a processing unit 1502, a system memory 1504, and a bus 1506 that couples various system components including system memory 1504 to processing unit 1502. Bus 1506 represents one or more of any of several types of bus structures, including a memory bus or memory controller, a peripheral bus, an accelerated graphics port, and a processor or local bus using any of a variety of bus architectures. System memory 1504 includes read only memory (ROM) 1508 and random access memory (RAM) 1510. A basic input/output system 1512 (BIOS) is stored in ROM 1508.

Computer 1500 also has one or more of the following drives: a hard disk drive 1514 for reading from and writing to a hard disk, a magnetic disk drive 1516 for reading from or writing to a removable magnetic disk 1518, and an optical disk drive 1520 for reading from or writing to a removable optical disk 1522 such as a CD ROM, DVD ROM, or other optical media. Hard disk drive 1514, magnetic disk drive 1516, and optical disk drive 1520 are connected to bus 1506 by a hard disk drive interface 1524, a magnetic disk drive interface 1526, and an optical drive interface 1528, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1530, one or more application programs 1532, other program modules 1534, and program data 1536. Application programs 1532 or program modules 1534 may include, for example, computer program logic for implementing any one or more of control logic 110, the control logic 210, the control logic 310, the control logic 410, the control logic 510, the control logic 610, the control logic 1310, the state logic 1320, the determination logic 1322, the display logic 1324, the gesture logic 1326, the audio logic 1328, the control logic 1492, flowchart 1100 (including any step of flowchart 1100), and/or flowchart 1200 (including any step of flowchart 1200), as described herein.

A user may enter commands and information into the computer 1500 through input devices such as keyboard 1538 and pointing device 1540. Other input devices (not shown) may include a microphone, joystick, game pad, satellite dish, scanner, touch screen, camera, accelerometer, gyroscope, or the like. These and other input devices are often connected to the processing unit 1502 through a serial port interface 1542 that is coupled to bus 1506, but may be connected by other interfaces, such as a parallel port, game port, or a universal serial bus (USB).

A display device 1544 (e.g., a monitor) is also connected to bus 1506 via an interface, such as a video adapter 1546. In addition to display device 1544, computer 1500 may include other peripheral output devices (not shown) such as speakers and printers.

Computer 1500 is connected to a network 1548 (e.g., the Internet) through a network interface or adapter 1550, a modem 1552, or other means for establishing communications over the network. Modem 1552, which may be internal or external, is connected to bus 1506 via serial port interface 1542.

As used herein, the terms "computer program medium" and "computer-readable storage medium" are used to generally refer to media (e.g., non-transitory media) such as the hard disk associated with hard disk drive 1514, removable magnetic disk 1518, removable optical disk 1522, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 1532 and other program modules 1534) may be stored on the hard disk, magnetic disk, optical disk, ROM, or RAM. Such computer programs may also be received via network interface 1550 or serial port interface 1542. Such computer programs, when executed or loaded by an application, enable computer 1500 to implement features of embodiments discussed herein. Accordingly, such computer programs represent controllers of the computer 1500.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

IV. Further Discussion of Some Example Embodiments

An example device comprises a plurality of screen regions, including at least a first screen region, a second screen region, and a third screen region. The example device further comprises a hinge coupled between the first screen region and the second screen region. The third screen region is provided on the hinge. The example device further comprises determination logic configured to determine information to be displayed on the third screen region based at least in part on a state of the hinge.

In a first aspect of the example device, the determination logic is configured to determine the information based at least in part on a hinge angle between a first surface of the first screen region and a second surface of the second screen region.

In a first implementation of the first aspect of the example device, the determination logic is configured to determine one or more virtual controls to be displayed on the third screen region based at least in part on the hinge angle being greater than zero degrees and less than 180 degrees. In accordance with the first implementation, at least one of the one or more virtual controls is configured to enable a user of the example device to provide an input to control an application that is displayed on at least one of the first screen region or the second screen region.

In a second implementation of the first aspect of the example device, the example device further comprises gesture logic configured to detect a gesture that is directed to the third screen region. In accordance with second implementation, the determination logic is configured to determine an interface element to be displayed on the third screen region based at least in part on the hinge angle being greater than zero degrees and less than 180 degrees and further based at least in part on detection of the gesture.

In a third implementation of the first aspect of the example device, the determination logic is configured to determine a notification to be displayed on the third screen region based at least in part on the hinge angle being either a) greater than zero degrees and less than 180 degrees or b) greater than 180 degrees and less than 360 degrees.

In a fourth implementation of the first aspect of the example device, the determination logic is configured to determine one or more virtual controls to be displayed on the third screen region based at least in part on the hinge angle being greater than 180 degrees and less than 360 degrees. In accordance with the fourth implementation, at least one of the one or more virtual controls is configured to enable a first user of the first screen region and a second user of the second screen region to provide respective inputs that cause operations to be performed by an application of which a first representation is displayed on the first screen region and a second representation is displayed on the second screen region.

In a fifth implementation of the first aspect of the example device, the example device further comprises gesture logic configured to detect a gesture that is directed to the third screen region. In accordance with fifth implementation, the example device further comprises display logic configured to copy or move content that is displayed on the first screen region to the second screen region based at least in part on the hinge angle being greater than 180 degrees and less than 360 degrees and further based at least in part on detection of the gesture.

In a sixth implementation of the first aspect of the example device, the determination logic is configured to determine a portion of an image to be displayed on the third screen region based at least in part on the hinge angle being approximately 180 degrees. In accordance with sixth implementation, the example device further comprises display logic configured to display the image such that the image spans the first screen region, the second screen region, and the third screen region based at least in part on the hinge angle being approximately 180 degrees.

In a seventh implementation of the first aspect of the example device, the example device further comprises display logic configured to display a first application on the first screen region. In accordance with the seventh implementation, the display logic is further configured to display a second application that is different from the first application on the second screen region. In further accordance with the seventh implementation, the determination logic is configured to determine the information, which indicates how to move one or more interface elements that are related to the first application from the first screen region to the second screen region, to be displayed on the third screen region based at least in part on the hinge angle being approximately 180 degrees.

In an eighth implementation of the first aspect of the example device, the example device further comprises display logic configured to display a first application on the first screen region. In accordance with the eighth implementation, the determination logic is configured to determine the information, which indicates a second application that is different from the first application and that is associated with the second screen region, to be displayed on the third screen region based at least in part on the hinge angle being approximately 360 degrees.

In a ninth implementation of the first aspect of the example device, the determination logic is configured to determine a notification to be displayed on the third screen region based at least in part on the hinge angle being approximately zero degrees.

In a tenth implementation of the first aspect of the example device, the determination logic is configured to determine the information based at least in part on the hinge angle being approximately zero degrees and further based at least in part on one or more processes being executed by the example device.

In a second aspect of the example device, the determination logic is configured to determine whether content is dragged from the first screen region to the third screen region. In accordance with the second aspect, the determination logic is configured to provide the content as an input to an application that is associated with the third screen region based at least in part on the content being dragged from the first screen region to the third screen region. The second aspect of the example device may be implemented in combination with the first aspect of the example device, though the example embodiments are not limited in this respect.

In a third aspect of the example device, the example device further comprises audio logic configured to provide first audio content to a user of the example device. The first audio content is associated with a first application that is displayed on the first screen region. In accordance with the third aspect, the example device further comprises gesture logic configured to detect a gesture that is directed to the third screen region. In further accordance with the third aspect, the determination logic is configured to cause audio content that is provided by the audio logic to the user to change from the first audio content to second audio content that is associated with a second application that is displayed on the second screen region based at least in part on detection of the gesture. The third aspect of the example device may be implemented in combination with the first and/or second aspect of the example device, though the example embodiments are not limited in this respect.

In a fourth aspect of the example device, the determination logic is configured to determine the information further based at least in part on an orientation of the example device. The fourth aspect of the example device may be implemented in combination with the first, second, and/or third aspect of the example device, though the example embodiments are not limited in this respect.

In a fifth aspect of the example device, the determination logic is configured to determine the information further based at least in part on a manner in which the example device is being held. The fifth aspect of the example device may be implemented in combination with the first, second, third, and/or fourth aspect of the example device, though the example embodiments are not limited in this respect.

In a sixth aspect of the example device, the determination logic is configured to determine the information further based at least in part on the example device being located on a surface of an object. The sixth aspect of the example device may be implemented in combination with the first, second, third, fourth, and/or fifth aspect of the example device, though the example embodiments are not limited in this respect.

In a seventh aspect of the example device, the determination logic is configured to determine the information further based at least in part on a context of a user of the example device. The seventh aspect of the example device may be implemented in combination with the first, second, third, fourth, fifth, and/or sixth aspect of the example device, though the example embodiments are not limited in this respect.

In an eighth aspect of the example device, the determination logic is configured to determine the information further based at least in part on a designated application being executed in foreground by the example device. The eighth aspect of the example device may be implemented in combination with the first, second, third, fourth, fifth, sixth, and/or seventh aspect of the example device, though the example embodiments are not limited in this respect.

In a ninth aspect of the example device, the determination logic is configured to determine the information further based at least in part on a designated application being executed in background by the example device. The ninth aspect of the example device may be implemented in combination with the first, second, third, fourth, fifth, sixth, seventh, and/or eighth aspect of the example device, though the example embodiments are not limited in this respect.

In a tenth aspect of the example device, the determination logic is configured to determine the information further based at least in part on a state of an operating system of the example device. The tenth aspect of the example device may be implemented in combination with the first, second, third, fourth, fifth, sixth, seventh, eighth, and/or ninth aspect of the example device, though the example embodiments are not limited in this respect.

In an eleventh aspect of the example device, the determination logic is configured to determine the information further based at least in part on a state of a user interface associated with a task that is being performed by a user of the example device. The eleventh aspect of the example device may be implemented in combination with the first, second, third, fourth, fifth, sixth, seventh, eighth, ninth, and/or tenth aspect of the example device, though the example embodiments are not limited in this respect.

In a twelfth aspect of the example device, the determination logic is configured to determine one or more virtual controls to be displayed on the third screen region based at least in part on the state of the hinge. In accordance with the twelfth aspect, at least one of the one or more virtual controls is configured to enable a user of the example device to control a process that is executed by the example device. The twelfth aspect of the example device may be implemented in combination with the first, second, third, fourth, fifth, sixth, seventh, eighth, ninth, tenth, and/or eleventh aspect of the example device, though the example embodiments are not limited in this respect.

In an example method, a state of a hinge that is coupled between a first screen region and a second screen region is determined. Information to be displayed on a third screen region that is provided on the hinge is determined based at least in part on the state of the hinge.

In a first aspect of the example method, determining the state of the hinge comprises determining a hinge angle between a first surface of the first screen region and a second surface of the second screen region. In accordance with the first aspect, the information is based at least in part on the hinge angle.

In a first implementation of the first aspect of the example method, determining the information comprises determining one or more virtual controls to be displayed on the third screen region based at least in part on the hinge angle being greater than zero degrees and less than 180 degrees. In accordance with the first implementation, at least one of the one or more virtual controls is configured to enable a user of a device that includes the first screen region, the second screen region, and the third screen region to provide an input to control an application that is displayed on at least one of the first screen region or the second screen region.

In a second implementation of the first aspect of the example method, the example method further comprises detecting a gesture that is directed to the third screen region. In accordance with the second implementation, determining the information comprises determining an interface element to be displayed on the third screen region based at least in part on the hinge angle being greater than zero degrees and less than 180 degrees and further based at least in part on detection of the gesture.

In a third implementation of the first aspect of the example method, determining the information comprises determining a notification to be displayed on the third screen region based at least in part on the hinge angle being either a) greater than zero degrees and less than 180 degrees or b) greater than 180 degrees and less than 360 degrees.

In a fourth implementation of the first aspect of the example method, determining the information comprises determining one or more virtual controls to be displayed on the third screen region based at least in part on the hinge angle being greater than 180 degrees and less than 360 degrees. In accordance with the fourth implementation, at least one of the one or more virtual controls is configured to enable a first user of the first screen region and a second user of the second screen region to provide respective inputs that cause operations to be performed by an application of which a first representation is displayed on the first screen region and a second representation is displayed on the second screen region.

In a fifth implementation of the first aspect of the example method, the example method further comprises detecting a gesture that is directed to the third screen region. In accordance with the fifth implementation, the example method further comprises copying or moving content that is displayed on the first screen region to the second screen region based at least in part on the hinge angle being greater than 180 degrees and less than 360 degrees and further based at least in part on detection of the gesture.

In a sixth implementation of the first aspect of the example method, determining the information comprises determining a portion of an image to be displayed on the third screen region based at least in part on the hinge angle being approximately 180 degrees. In accordance with the sixth implementation, the example method further comprises displaying the image such that the image spans the first screen region, the second screen region, and the third screen region based at least in part on the hinge angle being approximately 180 degrees.

In a seventh implementation of the first aspect of the example method, the example method further comprises displaying a first application on the first screen region. In accordance with the seventh implementation, the example method further comprises displaying a second application that is different from the first application on the second screen region. In further accordance with the seventh implementation, determining the information comprises determining the information, which indicates how to move one or more interface elements that are related to the first application from the first screen region to the second screen region, to be displayed on the third screen region based at least in part on the hinge angle being approximately 180 degrees.

In an eighth implementation of the first aspect of the example method, the example method further comprises displaying a first application on the first screen region. In accordance with the eighth implementation, determining the information comprises determining the information, which indicates a second application that is different from the first application and that is associated with the second screen region, to be displayed on the third screen region based at least in part on the hinge angle being approximately 360 degrees.

In a ninth implementation of the first aspect of the example method, determining the information comprises determining a notification to be displayed on the third screen region based at least in part on the hinge angle being approximately zero degrees.

In a tenth implementation of the first aspect of the example method, the information is based at least in part on the hinge angle being approximately zero degrees and further based at least in part on one or more processes being executed by a device that includes the first screen region, the second screen region, and the third screen region.

In a second aspect of the example method, the example method further comprises determining that content is dragged from the first screen region to the third screen region. In accordance with the second aspect, the example method further comprises providing the content as an input to an application that is associated with the third screen region based at least in part on the content being dragged from the first screen region to the third screen region. The second aspect of the example method may be implemented in combination with the first aspect of the example method, though the example embodiments are not limited in this respect.

In a third aspect of the example method, the example method further comprises providing first audio content to a user of a device that includes the first screen region, the second screen region, and the third screen region. The first audio content associated with a first application that is displayed on the first screen region. In accordance with the third aspect, the example method further comprises detecting a gesture that is directed to the third screen region. In further accordance with the third aspect, the example method further comprises causing audio content that is provided to the user to be changed from the first audio content to second audio content that is associated with a second application that is displayed on the second screen region based at least in part on detection of the gesture. The third aspect of the example method may be implemented in combination with the first and/or second aspect of the example method, though the example embodiments are not limited in this respect.

In a fourth aspect of the example method, the information is further based at least in part on an orientation of a device that includes the first screen region, the second screen region, and the third screen region. The fourth aspect of the example method may be implemented in combination with the first, second, and/or third aspect of the example method, though the example embodiments are not limited in this respect.

In a fifth aspect of the example method, the information is further based at least in part on a manner in which a device that includes the first screen region, the second screen region, and the third screen region is being held. The fifth aspect of the example method may be implemented in combination with the first, second, third, and/or fourth aspect of the example method, though the example embodiments are not limited in this respect.

In a sixth aspect of the example method, the information is further based at least in part on a device that includes the first screen region, the second screen region, and the third screen region being located on a surface of an object. The sixth aspect of the example method may be implemented in combination with the first, second, third, fourth, and/or fifth aspect of the example method, though the example embodiments are not limited in this respect.

In a seventh aspect of the example method, the information is further based at least in part on a context of a user of a device that includes the first screen region, the second screen region, and the third screen region. The seventh aspect of the example method may be implemented in combination with the first, second, third, fourth, fifth, and/or sixth aspect of the example method, though the example embodiments are not limited in this respect.

In an eighth aspect of the example method, the information is further based at least in part on a designated application being executed in foreground by a device that includes the first screen region, the second screen region, and the third screen region. The eighth aspect of the example method may be implemented in combination with the first, second, third, fourth, fifth, sixth, and/or seventh aspect of the example method, though the example embodiments are not limited in this respect.

In a ninth aspect of the example method, the information is further based at least in part on a designated application being executed in background by a device that includes the first screen region, the second screen region, and the third screen region. The ninth aspect of the example method may be implemented in combination with the first, second, third, fourth, fifth, sixth, seventh, and/or eighth aspect of the example method, though the example embodiments are not limited in this respect.

In a tenth aspect of the example method, the information is further based at least in part on a state of an operating system of a device that includes the first screen region, the second screen region, and the third screen region. The tenth aspect of the example method may be implemented in combination with the first, second, third, fourth, fifth, sixth, seventh, eighth, and/or ninth aspect of the example method, though the example embodiments are not limited in this respect.

In an eleventh aspect of the example method, the information is further based at least in part on a state of a user interface associated with a task that is being performed by a user of a device that includes the first screen region, the second screen region, and the third screen region. The eleventh aspect of the example method may be implemented in combination with the first, second, third, fourth, fifth, sixth, seventh, eighth, ninth, and/or tenth aspect of the example method, though the example embodiments are not limited in this respect.

In a twelfth aspect of the example method, determining the information comprises determining one or more virtual controls to be displayed on the third screen region based at least in part on the state of the hinge. In accordance with the eleventh aspect, at least one of the one or more virtual controls is configured to enable a user of a device that includes the first screen region, the second screen region, and the third screen region to control a process that is executed by the device. The twelfth aspect of the example method may be implemented in combination with the first, second, third, fourth, fifth, sixth, seventh, eighth, ninth, tenth, and/or eleventh aspect of the example method, though the example embodiments are not limited in this respect.

An example computer program product comprises a computer-readable storage medium having instructions recorded thereon for enabling a processor-based system to determine information to be displayed. The instructions comprise first instructions for enabling the processor-based system to determine a state of a hinge that is coupled between a first screen region and a second screen region. The instructions further comprise second instructions for enabling the processor-based system to determine the information to be displayed on a third screen region that is provided on the hinge based at least in part on the state of the hinge.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A device comprising:
  a plurality of screen regions, including at least a first screen region, a second screen region, and a third screen region;
  a hinge coupled between the first screen region and the second screen region to provide a hinge angle,
  the third screen region provided on the hinge; and
  one or more processors that perform operations comprising:
    determine one or more virtual controls to be displayed on the third screen region based at least in part on the hinge angle being greater than zero degrees and less than 180 degrees, the one or more virtual controls enable a user of the device to provide an input to control an application that is displayed on at least one of the first screen region or the second screen region.

2. The device of claim 1, wherein the one or more processors perform the operation comprising:
  display the one or more virtual controls based at least in part on initiation of the application.

3. The device of claim 2, wherein the one or more processors perform the operation comprising:
  discontinue display of the one or more virtual controls based at least in part on termination of the application.

4. The device of claim 1, wherein the one or more processors perform the operations comprising:
detect a gesture that is directed to the third screen region; and
determine the one or more virtual controls to be displayed on the third screen region based at least in part on the hinge angle being greater than zero degrees and less than 180 degrees and further based at least in part on detection of the gesture.

5. The device of claim 1, wherein the one or more processors perform the operations comprising:
determine a notification to be displayed on the third screen region based at least in part on the hinge angle being greater than zero degrees and less than 180 degrees.

6. The device of claim 5, wherein the one or more processors perform the operations comprising:
determine the notification that is to be displayed on the third screen region and that indicates contextual information regarding the device, based at least in part on the hinge angle being greater than zero degrees and less than 180 degrees.

7. The device of claim 5, wherein the one or more processors perform the operations comprising:
determine the notification that is to be displayed on the third screen region and that indicates an amount of battery power of the device that remains, based at least in part on the hinge angle being greater than zero degrees and less than 180 degrees.

8. The device of claim 5, wherein the one or more processors perform the operations comprising:
determine the notification that is to be displayed on the third screen region and that indicates an application displayed on at least one of the first screen region or the second screen region, based at least in part on the hinge angle being greater than zero degrees and less than 180 degrees.

9. The device of claim 5, wherein the one or more processors perform the operations comprising:
determine the notification that is to be displayed on the third screen region and that indicates one or more other devices that are connected to the device, based at least in part on the hinge angle being greater than zero degrees and less than 180 degrees.

10. The device of claim 5, wherein the one or more processors perform the operations comprising:
determine the notification that is to be displayed on the third screen region and that indicates at least one of a current time or a current date or a user to whom the device is assigned, based at least in part on the hinge angle being greater than zero degrees and less than 180 degrees.

11. The device of claim 5, wherein the one or more processors perform the operations comprising:
determine the notification that is to be displayed on the third screen region and that indicates at least one of a) a number of messages that have been received, b) a number of message that have been missed, c) a number of calls that have been received, or d) a number of calls that have been missed, based at least in part on the hinge angle being greater than zero degrees and less than 180 degrees.

12. A device comprising:
a plurality of screen regions, including at least a first screen region, a second screen region, and a third screen region;
a hinge coupled between the first screen region and the second screen region to provide a hinge angle,
the third screen region provided on the hinge; and
one or more processors that perform operations comprising:
determine one or more virtual controls to be displayed on the third screen region based at least in part on the hinge angle being greater than 180 degrees and less than 360 degrees,
at least one of the one or more virtual controls enables a first user of the first screen region and a second user of the second screen region to provide respective inputs that cause operations to be performed by an application of which a first representation is displayed on the first screen region and a second representation is displayed on the second screen region.

13. The device of claim 12, wherein at least one of the one or more virtual controls is configured to enable at least one of the first user or the second user to synchronize a state of the first representation and a state of the second representation.

14. The device of claim 12, wherein at least one of the one or more virtual controls is configured to enable at least one of the first user or the second user to at least one of watch a same video or temporally align the video in each of the first and second representations.

15. The device of claim 12, wherein at least one of the one or more virtual controls is configured to enable at least one of the first user or the second user to de-synchronize a state of the first representation and a state of the second representation.

16. The device of claim 15, wherein the first representation and the second representation include a common video; and
wherein at least one of the one or more virtual controls is configured to enable the first user to pause the video in the first representation while the second user continues to watch the video in the second representation.

17. The device of claim 15, wherein the first representation and the second representation include a common video; and
wherein at least one of the one or more virtual controls is configured to enable the first user to replace the video in the first representation with another video while the second user continues to watch the video in the second representation.

18. The device of claim 12, wherein the one or more processors perform the operations comprising:
detect a gesture that is directed to the third screen region; and
copy or move content that is displayed on the first screen region to the second screen region based at least in part on the hinge angle being greater than 180 degrees and less than 360 degrees and further based at least in part on detection of the gesture.

19. A device comprising:
a plurality of screen regions, including at least a first screen region, a second screen region, and a third screen region;
a hinge coupled between the first screen region and the second screen region to provide a hinge angle,
the third screen region provided on the hinge; and
one or more processors that perform operations comprising:
determine information to be displayed on the third screen region based at least in part on a state of the hinge and further based at least in part on a designated application being executed in background by the device.

20. The device of claim 19, wherein the one or more processors perform the operations comprising:
determine one or more virtual controls, which are configured to enable a user of the device to control operation of the designated application, to be displayed on the third screen region based at least in part on the state of the hinge and further based at least in part on the designated application being executed in the background by the device.

\* \* \* \* \*